(12) United States Patent
Zhu et al.

(10) Patent No.: US 11,228,726 B2
(45) Date of Patent: Jan. 18, 2022

(54) SOLID-STATE IMAGING DEVICE, CONTROL METHOD THEREOF, AND ELECTRONIC APPARATUS

(71) Applicant: SONY SEMICONDUCTOR SOLUTIONS CORPORATION, Kanagawa (JP)

(72) Inventors: Hongbo Zhu, Tokyo (JP); Mamoru Sato, Kanagawa (JP); Akihiko Kato, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/116,459

(22) Filed: Dec. 9, 2020

(65) Prior Publication Data

US 2021/0092317 A1 Mar. 25, 2021

Related U.S. Application Data

(63) Continuation of application No. 16/340,925, filed as application No. PCT/JP2017/037475 on Oct. 17, 2017, now Pat. No. 10,887,538.

(30) Foreign Application Priority Data

Oct. 26, 2016 (JP) .................................. 2016-209290

(51) Int. Cl.
*H04N 5/3745* (2011.01)
*H04N 5/357* (2011.01)
*H04N 5/378* (2011.01)

(52) U.S. Cl.
CPC ........... *H04N 5/3745* (2013.01); *H04N 5/357* (2013.01); *H04N 5/378* (2013.01)

(58) Field of Classification Search
CPC ....... H04N 5/357; H04N 5/3745; H04N 5/378
See application file for complete search history.

(56) References Cited

U.S. PATENT DOCUMENTS

| RE38,499 E * | 4/2004 | Merrill ............... H04N 5/37457 |
| | | 348/301 |
| 7,375,748 B2 * | 5/2008 | Krymski .............. H04N 5/3575 |
| | | 348/241 |
| 7,750,281 B2 * | 7/2010 | Asaba ............... H01L 27/14609 |
| | | 250/208.1 |
| 2008/0258047 A1 * | 10/2008 | Sakakibara ............... G01J 1/44 |
| | | 250/214 C |
| 2016/0301886 A1 * | 10/2016 | Muto ..................... H04N 5/378 |

* cited by examiner

*Primary Examiner* — Lin Ye
*Assistant Examiner* — Chriss S Yoder, III
(74) *Attorney, Agent, or Firm* — Sheridan Ross P.C.

(57) ABSTRACT

An imaging device includes a plurality of pixels including a first pixel and a second pixel, and a differential amplifier including a first amplification transistor, a second amplification transistor, and a first load transistor. The first load transistor receives a power source voltage. The imaging device includes a first signal line coupled to the first amplification transistor and the first load transistor, a second signal line coupled to the second amplification transistor, and a first reset transistor configured to receive the power source voltage. A gate of the first reset transistor is coupled to the first load transistor. The first pixel includes a first photoelectric conversion element and the first amplification transistor, and the second pixel includes a second photoelectric conversion element and the second amplification transistor.

20 Claims, 27 Drawing Sheets

SOLID-STATE IMAGING DEVICE, CONTROL METHOD THEREOF, AND ELECTRONIC APPARATUS

CROSS REFERENCE TO RELATED APPLICATIONS

This application is a continuation of U.S. patent application Ser. No. 16/340,925 filed Apr. 10, 2019, which is a national stage application under 35 U.S.C. 371 and claims the benefit of PCT Application No. PCT/JP2017/037475 having an international filing date of Oct. 17, 2017, which designated the United States, which PCT application claimed the benefit of Japanese Patent Application No. 2016-209290 filed Oct. 26, 2020, the disclosures of which are incorporated herein by reference in their entirety.

TECHNICAL FIELD

The present technology relates to a solid-state imaging device, a control method thereof, and an electronic apparatus and more particularly to a solid-state imaging device capable of adjusting an operation range of a differential amplifier within an optimal operation range, a control method thereof, and an electronic apparatus.

BACKGROUND ART

A solid-state imaging device has, for example, a configuration in which a photodiode (PD) corresponding to a photoelectric conversion element, four pixel transistors including a transfer transistor, a reset transistor, an amplification transistor, and a selection transistor, and a floating diffusion (FD) are disposed at each pixel. In each pixel, a signal charge which is photoelectrically converted by the PD is transferred to the FD, is converted into voltage information and is amplified by the amplification transistor, and is output to the AD conversion unit. The AD conversion unit realizes an AD conversion by comparing a voltage of an input analog pixel signal with a voltage of a reference signal having a slope shape with a constant inclination in the direction of time and counting a time until an output of a comparison result is inverted.

Hitherto, a source follower circuit has been widely used to amplify the pixel signal using the amplification transistor, but a differential amplifier having a large amplification ratio is also proposed (for example, see Patent Literatures 1 and 2). If the amplification rate is large, there is an effect that an input-referred noise generated in the AD conversion unit at the subsequent stage becomes small.

For example, in a case where a source follower circuit is used, it is assumed that the conversion efficiency of the pixel is 100 $\mu$V/e- (the output amplitude of the amplification transistor is 100 $\mu$V in a case of the input of electron of 1 e- by the PD), the noise of the output unit of the amplification transistor is 100 $\mu$Vrms (1e- rms), and the noise of the AD conversion unit is 100 $\mu$Vrms (1e- rms). Since the total noise at this time is represented by the square sum of $\sqrt{(100 \mu Vrms^2 + 100 \mu Vrms^2)} = 141$ $\mu$Vrms, the input-referred noise is 1.41 e- rms.

Meanwhile, in a case where the differential amplifier is used, it is assumed that the conversion efficiency of the pixel is 500 $\mu$V/e-, the noise of the output unit of the amplification transistor is 500 $\mu$Vrms (1e- rms), and the noise of the AD conversion unit is 100 $\mu$Vrms (0.2e- rms). Since the total noise at this time is represented by the square sum of $\sqrt{(500 \mu Vrms^2 + 100 \mu Vrms^2)} = 510$ $\mu$Vrms, the input-referred noise is 1.02 e- rms.

Thus, since the input-referred noise of the AD conversion unit becomes smaller as the conversion efficiency of the pixel becomes higher, a noise reduction effect is exhibited.

CITATION LIST

Patent Literature

[PTL 1]
JP 2008-271280A
[PTL 2]
JP 2003-259218A

SUMMARY

Technical Problem

Since the output signal of the differential amplifier changes in accordance with the amount of light incident to the PD, parameters such as a parasitic capacitance Cgd between the gate and the drain (G-D) of the signal side amplification transistor or a small signal output resistance ro of the PMOS change. Since the gain of the differential amplifier depends on the parasitic capacitance Cgd of G-D of the amplification transistor or the small signal output resistance ro, the gain eventually changes in accordance with the amount of light incident to the PD. The magnitude of variation also changes within the operation range of the differential amplifier. There is an optimal operation range in which the gain is large and the gain variation is small in the operation range of the differential amplifier and the operation range of the differential amplifier is determined by the operation point immediately after resetting.

However, there is a case where the control of the operation point may be difficult immediately after the reset of the differential amplifier and the differential amplifier may be separated from the optimal operation range. As a result, the conversion efficiency of pixels decreases and the linearity deteriorates.

The present technology is made in view of such circumstances and is to adjust an operation range of a differential amplifier to an optimal operation range.

Solution to Problem

According to a first aspect of the present technology, provided is an imaging device including: a plurality of pixels including a first pixel and a second pixel; a differential amplifier including a first amplification transistor, a second amplification transistor, and a first load transistor, the first load transistor being configured to receive a power source voltage; a first signal line coupled to the first amplification transistor and the first load transistor; a second signal line coupled to the second amplification transistor; and a first reset transistor configured to receive the power source voltage, a gate of the first reset transistor being coupled to the first load transistor. The first pixel includes a first photoelectric conversion element and the first amplification transistor, and the second pixel includes a second photoelectric conversion element and the second amplification transistor.

According to a second aspect of the present technology, provided is an imaging device including: a first pixel including a first photoelectric conversion element, a first transfer transistor, and a first amplification transistor; a second pixel including a second photoelectric conversion element, a second transfer transistor, and a second amplification transistor; a first signal line coupled to the first amplification transistor; a second signal line coupled to the second amplification transistor; a first load transistor coupled to the first signal line, the first load transistor being configured to receive a power source voltage; and a first reset transistor configured to receive the power source voltage, a gate of the first reset transistor being coupled to the first load transistor. One of a source and a drain of the first amplification transistor is coupled to one of a source and a drain of the second amplification transistor, and the other of the source and the drain of the first amplification transistor is coupled to the other of the source and the drain of the second amplification transistor.

According to a third aspect of the present technology, provided is an imaging device including: a differential amplifier including: a first load transistor coupled to a power source; a second load transistor coupled to the power source; a first amplification transistor of a first pixel; a second amplification transistor of a second pixel; a first signal line coupled to the first load transistor and the first amplification transistor; and a second signal line coupled to the second load transistor and the second amplification transistor, wherein outputs of the first and second amplification transistors are connected to one another; and a reset element coupled to the differential amplifier and to reset the first pixel with a first current on the first signal line and reset the second pixel on the second signal line with a second current during a reset operation.

In the first to third aspects of the present technology, the pixel array unit (or plurality of pixels) may be provided with the first and second unit pixels (or first and second pixels) each including the photoelectric conversion element configured to photoelectrically convert the light incident to the pixel, the transfer transistor configured to transfer the signal charge photoelectrically converted by the photoelectric conversion element to the FD, the reset transistor configured to reset the signal charge of the FD, the amplification transistor configured to convert the signal charge stored in the FD into a voltage signal and output the voltage signal, and the selection transistor configured to select the pixel and in the differential amplifier component constituting the differential amplifier along with the amplification transistors and the selection transistors of the first and second unit pixels, a difference in current flowing to each of the signal side and the reference side of the differential pair is generated.

The solid-state imaging device and the electronic apparatus may be independent devices or modules assembled to other devices.

Advantageous Effects of Invention

According to the first to third aspects of the present technology, the operation range of the differential amplifier can be adjusted to the optimal operation range.

Additionally, the effects described herein are not necessarily limited and may be any of the effects described in the present technology.

DESCRIPTION OF EMBODIMENTS

Figure 1:
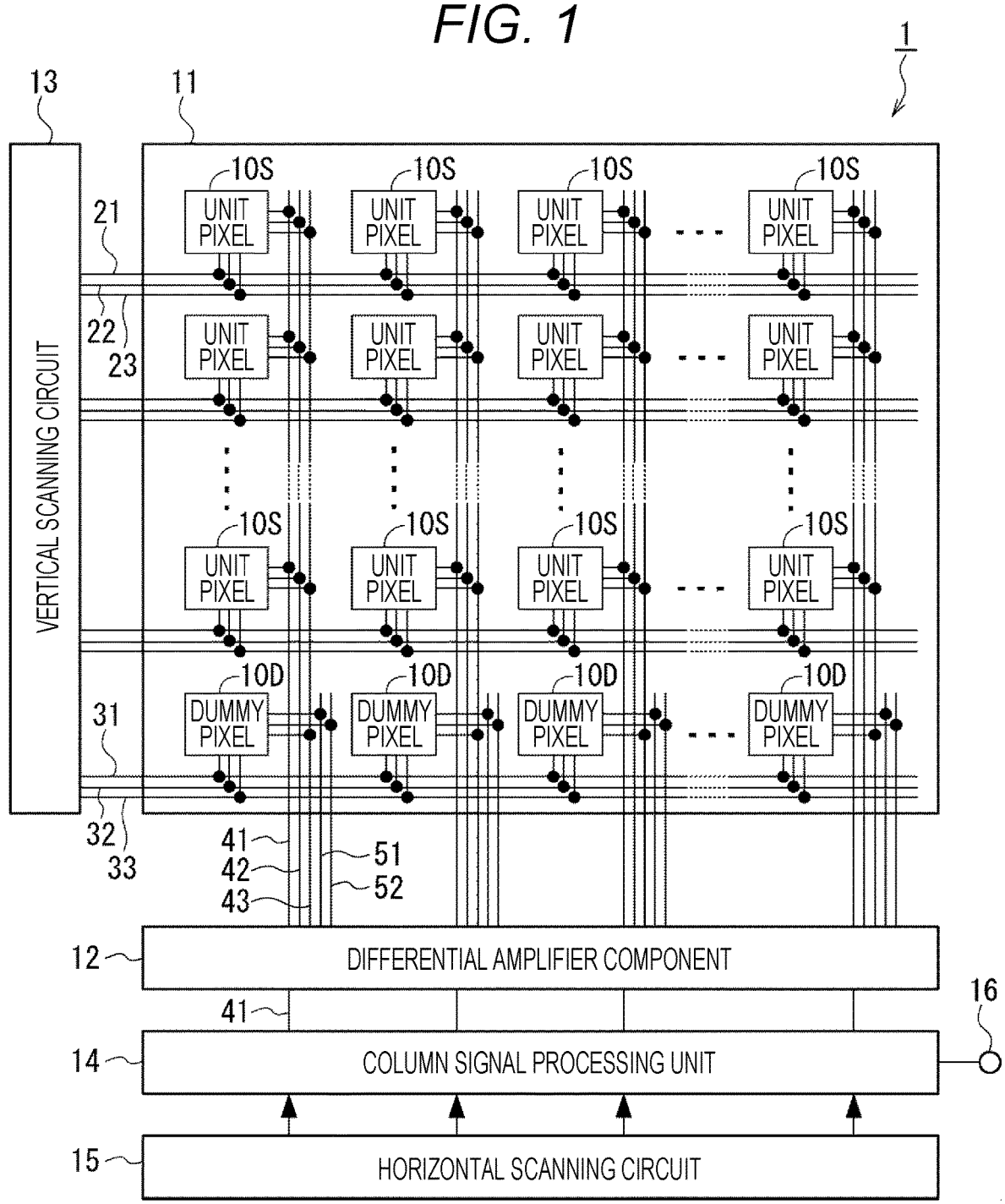
FIG. 1 is a diagram showing a schematic configuration of a solid-state imaging device according to a first embodiment of the present technology.

Hereinafter, a mode for carrying out the present technology (hereinafter, referred to as an embodiment) will be described. In addition, a description will be made according to the following procedure.
1. Schematic configuration of solid-state imaging device according to first embodiment
2. Configuration example of column signal processing unit 3. First configuration example of differential amplifier component
4. Second configuration example of differential amplifier component
5. Third configuration example of differential amplifier component
6. Fourth configuration example of differential amplifier component
7. Fifth configuration example of differential amplifier component
8. Sixth configuration example of differential amplifier component
9. Seventh configuration example of differential amplifier component
10. Eighth configuration example of differential amplifier component
11. Ninth configuration example of differential amplifier component
12. Tenth configuration example of differential amplifier component
13. Eleventh configuration example of differential amplifier component
14. Twelfth configuration example of differential amplifier component
15. Thirteenth configuration example of differential amplifier component
16. Fourteenth configuration example of differential amplifier component
17. Fifteenth configuration example of differential amplifier component
18. Schematic configuration of solid-state imaging device of second embodiment
19. Configuration example of signal switching unit
20. Summary
21. Application example of electronic apparatus

1. Schematic Configuration of Solid-State Imaging Device of First Embodiment FIG. 1 is a diagram showing a schematic configuration of a solid-state imaging device (a CMOS image sensor) according to a first embodiment of the present technology.

A solid-state imaging device 1 of FIG. 1 includes a pixel array unit 11, a differential amplifier component 12, a vertical scanning circuit 13, a column signal processing unit 14, a horizontal scanning circuit 15, and the like which are formed on, for example, a semiconductor substrate using Si (silicon) as a semiconductor.

The pixel array unit 11 is provided with a unit pixel 10S and a dummy pixel 10D. Specifically, the unit pixels 10S are arranged in an array inside an effective pixel area of the pixel array unit 11 and one dummy pixel 10D is disposed in at least one pixel column outside the effective pixel area. The unit pixel 10S is a pixel which outputs a pixel signal corresponding to a light receiving amount and corresponding to an output of the solid-state imaging device 1 and the dummy pixel 10D is a kind of the unit pixel 10S, but is a pixel which detects a reference value of a black level and is formed on an optical black (OPB) area being light-shielded by a metal film or the like so that incident light does not enter a photoelectric conversion element.

A selection control signal SEL_S transferred via a selection signal line 21, a reset control signal RST_S transferred via a reset signal line 22, and a transfer control signal TRG_S transferred via a transfer signal line 23 are respectively supplied from the vertical scanning circuits 13 to the unit pixels 10S.

A selection control signal SEL_D transferred via a selection signal line 31, a reset control signal RST_D transferred via a reset signal line 32, and a transfer control signal TRG_D transferred via a transfer signal line 33 are respectively supplied from the vertical scanning circuits 13 to the dummy pixels 10D.

The unit pixel 10S is connected to the differential amplifier component 12 via a column signal line 41, a column reset line 42, and a column Vcom line 43. The dummy pixel 10D is connected to the differential amplifier component 12 via a column signal line 51, a column reset line 52, and a column Vcom line 43.

The differential amplifier component 12 constitutes a differential amplifier together with an amplification transistor 104 and a selection transistor 105 (FIG. 3) of the unit pixel 10S and an amplification transistor 114 and a selection transistor 115 (FIG. 3) of the dummy pixel 10D, amplifies a pixel signal corresponding to an output of the unit pixel 10S, and outputs the pixel signal to the column signal processing unit 14. The unit pixel 10S is a signal side pixel which constitutes a differential pair of the differential amplifier component 12 and the dummy pixel 10D is a reference side pixel which constitutes a differential pair. The pixel signal which is amplified by the differential amplifier is output to the column signal processing unit 14 via the column signal line 41.

The vertical scanning circuit 13 includes a shift register or an address decoder and drives each unit pixel 10S by the unit of row or the like by supplying the selection control signal SEL_S, the reset control signal RST_S, and the transfer control signal TRG_S to each unit pixel 10S of the pixel array unit 11 and supplying the selection control signal SEL_D, the reset control signal RST_D, and the transfer control signal TRG_D to the dummy pixel 10D.

For example, the vertical scanning circuit 13 performs an electronic shutter operation for sweeping out signals of the unit pixels 10S of the row in the electronic shutter row and a reading operation for reading signals of the unit pixels 10S of the row in the reading row while scanning the unit pixels 10S of the pixel array unit 11 by the unit of row in the electronic shutter rows and the reading row in the vertical direction (the up and down direction).

Here, although not shown in the drawings, the vertical scanning circuit 13 includes a reading scanning system for performing a reading operation of reading the signals of the unit pixels 10S in the reading row while sequentially selecting the unit pixels 10S by the unit of row and an electronic shutter scanning system for performing an electronic shutter operation on the same row (the electronic shutter row) positioned just before by the amount of time corresponding to the shutter speed compared to the reading scanning by the reading scanning system.

Then, a period from a timing in which unnecessary signals charges of the photoelectric conversion unit are reset by the shutter scanning of the electronic shutter scanning system to a timing in which signals of the unit pixels 10S are read by the reading scanning of the reading scanning system becomes an accumulation period (an exposure period) by each unit of the signal charge in the unit pixels 10S. That is, the electronic shutter operation is an operation of resetting (sweeping out) signal charges stored in the photoelectric conversion unit and starting to accumulate new signal charges from the reset.

The pixel signal which is output from each of the unit pixels 10S of the pixel row selectively scanned by the vertical scanning circuit 13 is input to the column signal processing unit 14 via each of the column signal lines 41 every pixel column.

The column signal processing unit 14 performs a predetermined signal process on the pixel signal output from each of the unit pixels 10S of the reading row selected by the vertical scanning of the vertical scanning circuit 13, for example, every pixel column of the pixel array unit 11 and temporarily stores the pixel signal having been subjected to the signal process.

For example, the column signal processing unit 14 performs an AD conversion process and a correlated double sampling (CDS) process for removing reset noise or a fixed pattern noise originated from a pixel such as a variation in threshold value of the amplification transistor on the pixel signal output from each of the unit pixels 10S of the reading row selected by the vertical scanning.

The horizontal scanning circuit 15 includes a shift register or an address decoder and sequentially and horizontally scans each of the pixel columns of the pixel array unit 11 in the column signal processing unit 14 storing the pixel signal having been subjected to the signal process. By the horizontal scanning of the horizontal scanning circuit 15, the pixel signal having been subjected to the AD conversion of each of the unit pixels 10S of the reading row and stored in the column signal processing unit 14 is output from the output unit 16 to the outside of the apparatus.

The solid-state imaging device 1 with the above-described configuration is a CMOS image sensor called a column AD type in which a CDS process and an AD conversion process are performed for each pixel column.

2. Configuration Example of Column Signal Processing Unit

Figure 2:
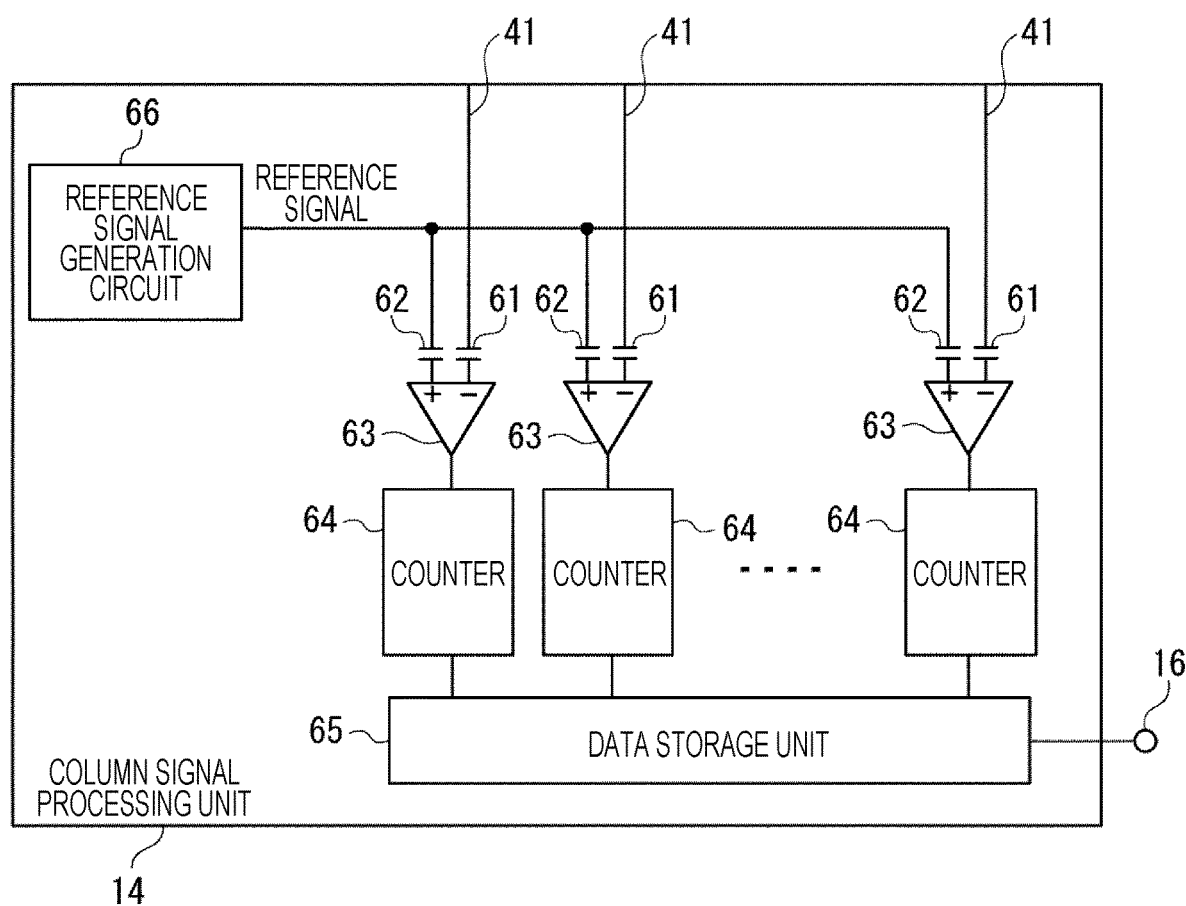
FIG. 2 is a diagram showing a configuration example of a column signal processing unit.

FIG. 2 is a diagram showing a configuration example of the column signal processing unit 14.

The column signal processing unit 14 includes capacitive elements 61 and 62, a comparator 63, a counter 64, a data storage unit 65, and a reference signal generation circuit 66. Among them, the capacitive elements 61 and 62, the comparator 63, and the counter 64 are provided by the unit of the pixel column.

The pixel signal output from the unit pixel 10S is amplified by the differential amplifier including the differential amplifier component 12 and is input to the capacitive element 61 via the column signal line 41. Meanwhile, a slope-shaped reference signal of which a level (a voltage) changes in an inclined manner with time is input from the reference signal generation circuit 66 to the capacitive element 62. The capacitive elements 61 and 62 are capacitive elements for an analog CDS (AUTO ZERO) which cancels variations of analog elements.

The comparator 63 outputs a difference signal obtained by comparing (a voltage of) the pixel signal input via the capacitive element 61 and (a voltage of) of the reference signal input via the capacitive element 62 to the counter 64. For example, a Hi (High) difference signal is supplied to the counter 64 in a case where the reference signal is smaller than the pixel signal and a Lo (Low) difference signal is supplied to the counter 64 in a case where the reference signal is larger than the pixel signal.

The counter 64 calculates a count value P by the counting during the supply of the Hi difference signal in the preset phase (P-phase) comparison period. Further, the counter 64 calculates a count value D by the counting during the supply of the Hi difference signal in the data phase (D-phase) comparison period. Then, the counter 64 supplies a difference value (D−P) obtained by subtracting the count value P in the P-phase comparison period from the count value D in the D-phase comparison period as the pixel data having been subjected to the CDS process and the AD conversion process to the data storage unit 65.

The data storage unit 65 stores the pixel data having been subjected to the AD conversion process and supplied from the counter 64 of each of the pixel columns and sequentially outputs the pixel data to the output unit 16 at a predetermined timing in accordance with the control of the horizontal scanning circuit 15.

3. First Configuration Example of Differential Amplifier Component

Figure 3:
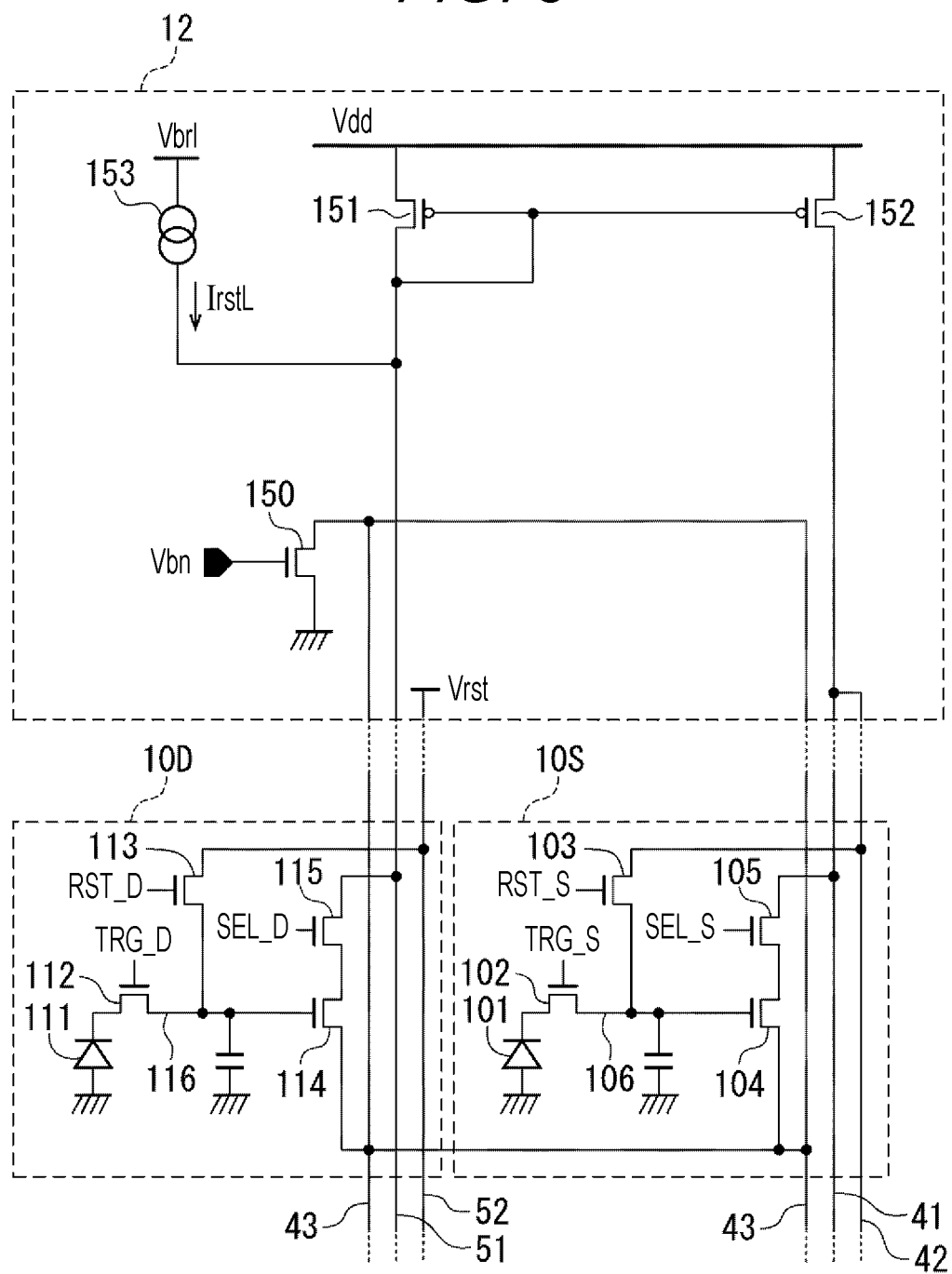
FIG. 3 is a diagram showing a first configuration example of a differential amplifier component and specific configurations of a unit pixel and a dummy pixel.

FIG. 3 is a diagram showing the first configuration example of the differential amplifier component 12.

Further, FIG. 3 also shows detained configuration examples of the unit pixel 10S and the dummy pixel 10D disposed at the same pixel column.

The unit pixel 10S includes a photodiode (PD) 101, a transfer transistor 102, a reset transistor 103, an amplification transistor 104, a selection transistor 105, and a floating diffusion (FD) 106.

The PD 101 is a photoelectric conversion element which obtains a signal charge in response to the incident light. The transfer transistor 102 transfers the signal charge stored in the PD 101 to the FD 106 on the basis of the transfer control signal TRG_S. The reset transistor 103 resets the signal charge of the FD 106 on the basis of the reset control signal RST_S. The amplification transistor 104 converts the signal charge of the FD 106 into a voltage signal and amplifies and outputs the voltage signal. The selection transistor 105 performs a control of determining whether an own pixel is a selected pixel among the unit pixels 10S arranged in an array inside the pixel array unit 11 on the basis of the selection control signal SEL_S. The FD 106 is a charge storage portion which stores the signal charge transferred from the PD 101 by the transfer transistor 102.

The dummy pixel 10D includes a PD 111, a transfer transistor 112, a reset transistor 113, an amplification transistor 114, a selection transistor 115, and a FD 116.

The dummy pixel 10D has the same configuration as that of the unit pixel 10S, but is different from the unit pixel 10S in that the PD 111 is light-shielded by a metal film or the like so that the incident light does not enter. The transfer transistor 112 is controlled by the transfer control signal TRG_D, the reset transistor 113 is controlled by the reset control signal RST_D, and the selection transistor 115 is controlled by the selection control signal SEL_D.

Additionally, the capacitances connected to the FD 106 of the unit pixel 10S and the FD 116 of the dummy pixel 10D indicate the parasitic capacitance of the floating diffusion and do not exist as capacitive element parts.

The differential amplifier component 12 includes an NMOS tail current source 150, PMOS loads 151 and 152 constituting a current mirror circuit, and a resetting constant current circuit (or reset element) 153.

The NMOS tail current source 150 is connected to the sources of the amplification transistors 104 and 114 via the column Vcom line 43. A bias voltage Vbn is applied to the gate of the NMOS tail current source 150 and a constant current flows to the amplification transistors 104 and 114.

The drain of one PMOS load 151 constituting the current mirror circuit is connected to the drain of the selection transistor 115 of the dummy pixel 10D via the column signal line 51. The drain of the other PMOS load 152 constituting the current mirror circuit is connected to the drain of the selection transistor 105 of the unit pixel 10S via the column signal line 41. The sources of the PMOS loads 151 and 152 are connected to a constant voltage source Vdd.

The PMOS loads 151 and 152 constituting the current mirror circuit allow the same current to flow to the column signal line 51 near the dummy pixel 10D and the column signal line 41 near the unit pixel 10S (e.g., during a read operation).

The resetting constant current circuit 153 is also connected to the column signal line 51 of the dummy pixel 10D. The resetting constant current circuit 153 is a circuit which is connected between a constant voltage source Vbrl and the drain of the PMOS load 151 and through which a current of a predetermined current value IrstL (IrstL1, IrstL2) flows. Specifically, as will be described later, the resetting constant current circuit 153 outputs a first current value IrstL1 during the resetting period and outputs a second current value InstR2 smaller than the first current value IrstL1 during the reading period so that different currents flow to the reference side of the differential pair between the resetting period and the reading period. Further, with this configuration, different currents flow to the reference side and the signal side of the differential pair during the resetting period.

The drain of the reset transistor 113 of the dummy pixel 10D is connected to the column reset line 52 and the reset voltage Vrst is supplied to the column reset line 52.

Meanwhile, the drain of the reset transistor 103 of the unit pixel 10S is connected to the column reset line 42 and the column reset line 42 is connected to the column signal line 41.

The differential amplifier component 12 constitutes the differential amplifier together with the amplification transistor 114 and the selection transistor 115 of the dummy pixel 10D and the amplification transistor 104 and the selection transistor 105 of the unit pixel 10S.

Figure 4:
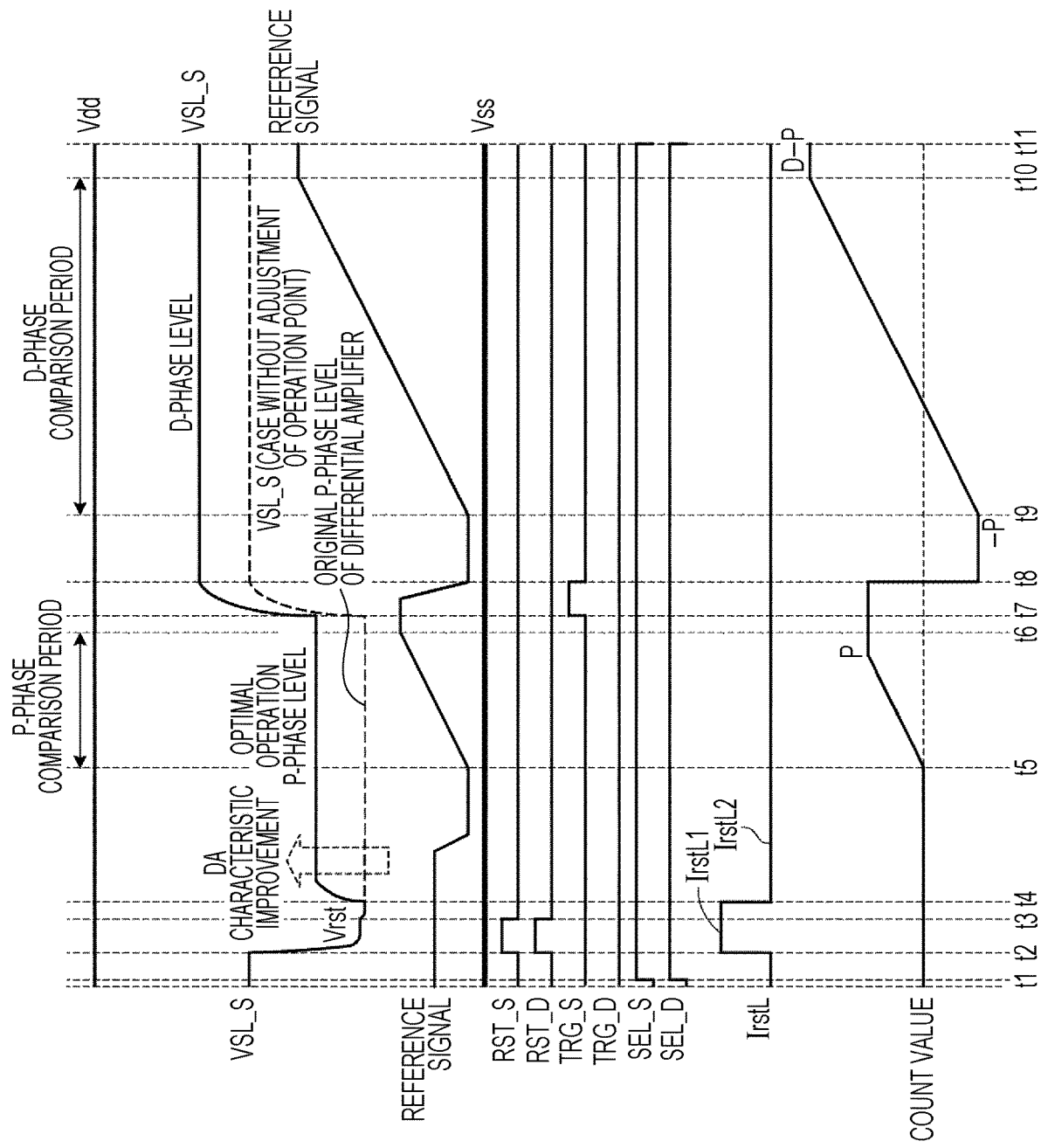
FIG. 4 is a timing chart showing an operation during a period 1H of the first configuration example.

Referring to FIG. 4, operations of the differential amplifier component 12, the unit pixel 10S, and the dummy pixel 10D of the first configuration example will be described.

FIG. 4 shows a timing chart of the unit pixel 10S and the dummy pixel 10D of the pixel array unit 11, the differential amplifier component 12 of the first configuration example, and the column signal processing unit 14 during a period 1H. The unit pixel 10S and the dummy pixel 10D are pixels of the same pixel column.

First, at the time t1, the selection control signal SEL_S and the selection control signal SEL_D supplied to the dummy pixel 10D at the same column as the unit pixel 10S selected to read the pixel signal is set to High (Hi) and the selection transistor 105 of the unit pixel 10S and the selection transistor 115 of the dummy pixel 10D are turned on. The selection control signal SEL_S and the selection control signal SEL_D are Hi until the time t11 corresponding to the end of the period 1H and thus the unit pixel 10S and the dummy pixel 10D are selected.

The resetting period starts from the next time t2 so that the reset control signals RST_S and RST_D are set to High (Hi). With this configuration, the reset transistor 103 of the unit pixel 10S and the reset transistor 113 of the dummy pixel 10D are turned on. Further, the resetting constant current circuit 153 changes the output current value IrstL to the first current value (the reset current value) IrstL1 (>IrstL2) larger than the second current value InstL2 kept so far.

In this state, the differential amplifier operates as a voltage follower, the potential of the FD 116 of the dummy pixel 10D becomes the reset voltage Vrst, and the potential of the FD 106 and the potential VSL_S of the column signal line 41 of the unit pixel 10S also follow the reset voltage Vrst.

At the next time t3, the reset control signals RST_S and RST_D are changed to Low (Lo) and the reset transistors 103 and 113 are turned off. When the reset transistors 103 and 113 are turned off, the potentials of the FDs 106 and 116 slightly decrease by switch feedthrough. However, a voltage variation of the potential VSL_S of the column signal line 41 can be reduced by the in-phase cancellation effect of the differential amplifier. In a case of a single-ended source-grounded amplifier, for example, the FD voltage drop due to feedthrough at the time of resetting is amplified by the gain of the amplifier of the pixel and the output end may exceed the operation range.

At the time t4 after a predetermined time elapses from the time t3, the current value IrstL output from the resetting constant current circuit 153 is returned from the first current value IrstL1 to the second current value InstL2 (<IrstL1) smaller than the first current value.

As shown in FIG. 4, the potential VSL_S of the column signal line 41 rises after the time t4 in response to the period until the time t4 in which the resetting constant current circuit 153 outputs the first current value IrstL1 from the time t3 in which the reset transistors 103 and 113 are turned off. The raised potential VSL_S of the column signal line 41 becomes the operation point (the operation start potential) used to determine the operation range of the differential amplifier.

In FIG. 4, the potential VSL_S in a case where the resetting constant current circuit 153 is not provided and the operation point is not adjusted is indicated by a dashed line. The optimal operation range of the differential amplifier exists at a range higher than the original operation point of the differential amplifier. If the resetting constant current circuit 153 allows a current larger than that of the signal side column signal line 41 to flow to the reference side column signal line 51 of the differential amplifier during a period from the time t3 to the time t4, the potential VSL_S of the column signal line 41 is raised to the optimal operation range of the differential amplifier.

For example, in a case where the differential amplifier is in an equilibrium state during a period from the time t3 to the time t4, a current of about 7 uA flows to each of the PMOS loads 151 and 152 when the current value output from the NMOS tail current source 150 is 20 uA and the first current value IrstL1 output from the resetting constant current circuit 153 is 6 uA. For this reason, a current of about 13 uA flows to the amplification transistor 114 of the dummy pixel 10D and a current of about 7 uA flows to the amplification transistor 104 of the unit pixel 10S. Thus, the resetting constant current circuit 153 generates a difference in the currents respectively flowing to the signal side and the reference side of the differential pair.

Meanwhile, since a current of about 10 uA flows to each of the PMOS loads 151 and 152 in a case where the second current value InstL2 output from the resetting constant current circuit 153 is 0 while the current value output from the NMOS tail current source 150 is 20 uA in a case where the differential amplifier is in an equilibrium state during the reading period to be described later, a current of about 10 uA flows to each of the amplification transistors 114 and 104.

A period from the time t3 in which the resetting constant current circuit 153 allows a current larger than that of the signal side column signal line 41 to flow to the reference side column signal line 51 of the differential amplifier to the time t4 is determined in advance on the basis of the optimal operation range of the differential amplifier in design.

Specifically, it is possible to design the magnitude of the current at the reference side and the signal side during the resetting period when the resetting constant current circuit 153 is used. Further, it is possible to also design a difference between the gate voltage of the amplification transistor 114 of the reference side dummy pixel 10D and the gate voltage of the amplification transistor 104 of the signal side unit pixel 10S. After the reset transistors 103 and 113 are turned off, the gates of the amplification transistors 114 and 104 are floated and thus the reading period is set. Here, if the variation amount of the current at the reference side and the signal side of the reading period is designed, the output voltage of the differential amplifier, that is, the potential VSL_S of the column signal line 41 can be adjusted within the optimal operation range.

During a P-phase comparison period from the time t5 to the time t6 after the potential VSL_S of the column signal line 41 is adjusted to the operation point (the operation start potential) of the optimal operation range of the differential amplifier, the voltage of the pixel signal of the unit pixel 10S and the voltage of the reference signal supplied from the reference signal generation circuit 66 are compared with each other and the count value P is calculated.

During a period from the time t7 to the time t8, the transfer control signal TRG_S of Hi is supplied to the transfer transistor 102 of the unit pixel 10S, the transfer transistor 102 is turned on, and the signal charge stored in the PD 101 is transferred to the FD 106. At this time, the transfer control signal TRG_D supplied to the transfer transistor 112 of the dummy pixel 10D is in the state of Lo.

The reading period of the pixel signal is set after the time t8 in which the transfer transistor 102 of the unit pixel 10S is turned off, the counter 64 sets the count value −P obtained by bit-inverting the count value P calculated in the P-phase comparison period to the initial count value.

During the D-phase comparison period from the time t9 to t10, the voltage of the pixel signal of the unit pixel 10S and the voltage of the reference signal supplied from the reference signal generation circuit 66 are compared with each other and a difference value (D−P) obtained by subtracting the count value P of the P-phase comparison period from the count value D of the D-phase comparison period is calculated.

Finally, if the selection control signal SEL_S and the selection control signal SEL_D are changed to Lo at the time t11, the selection transistor 105 of the unit pixel 10S and the selection transistor 115 of the dummy pixel 10D are turned off so that the period 1H ends.

As described above, according to the differential amplifier component 12 of the first configuration example of FIG. 3, the first current value IrstL1 is output from the resetting constant current circuit 153 during the resetting period so that a current larger than that of the signal side column signal line 41 is output to the reference side column signal line 51. Further, the resetting constant current circuit 153 outputs the second current value InstR2 smaller than the first current value IrstL1 during the reading period. In this way, if the resetting constant current circuit 153 generates a difference in current flowing to each of the signal side and the reference side of the differential pair during the resetting period to change the current flowing to the amplification transistors 114 and 104 between the resetting period and the reading period, the potential VSL_S of the column signal line 41 can be adjusted to the optimal operation point (operation range) of the differential amplifier at the upside (the high potential side) in relation to the original operation point of the differential amplifier. As a result, it is possible to improve linearity by improving the conversion efficiency of the amplification transistor 104.

The differential amplifier component 12 of the first configuration example of FIG. 3 is a configuration example of adjusting the operation point of the differential amplifier in a case where the optimal operation point of the differential amplifier is located at the upside (the high potential side) in relation to the original operation point of the differential amplifier.

Next, a configuration example of adjusting the operation point of the differential amplifier in a case where the optimal operation point of the differential amplifier is located at the downside (the low potential side) in relation to the original operation point of the differential amplifier will be described.

4. Second Configuration Example of Differential Amplifier Component

Figure 5:
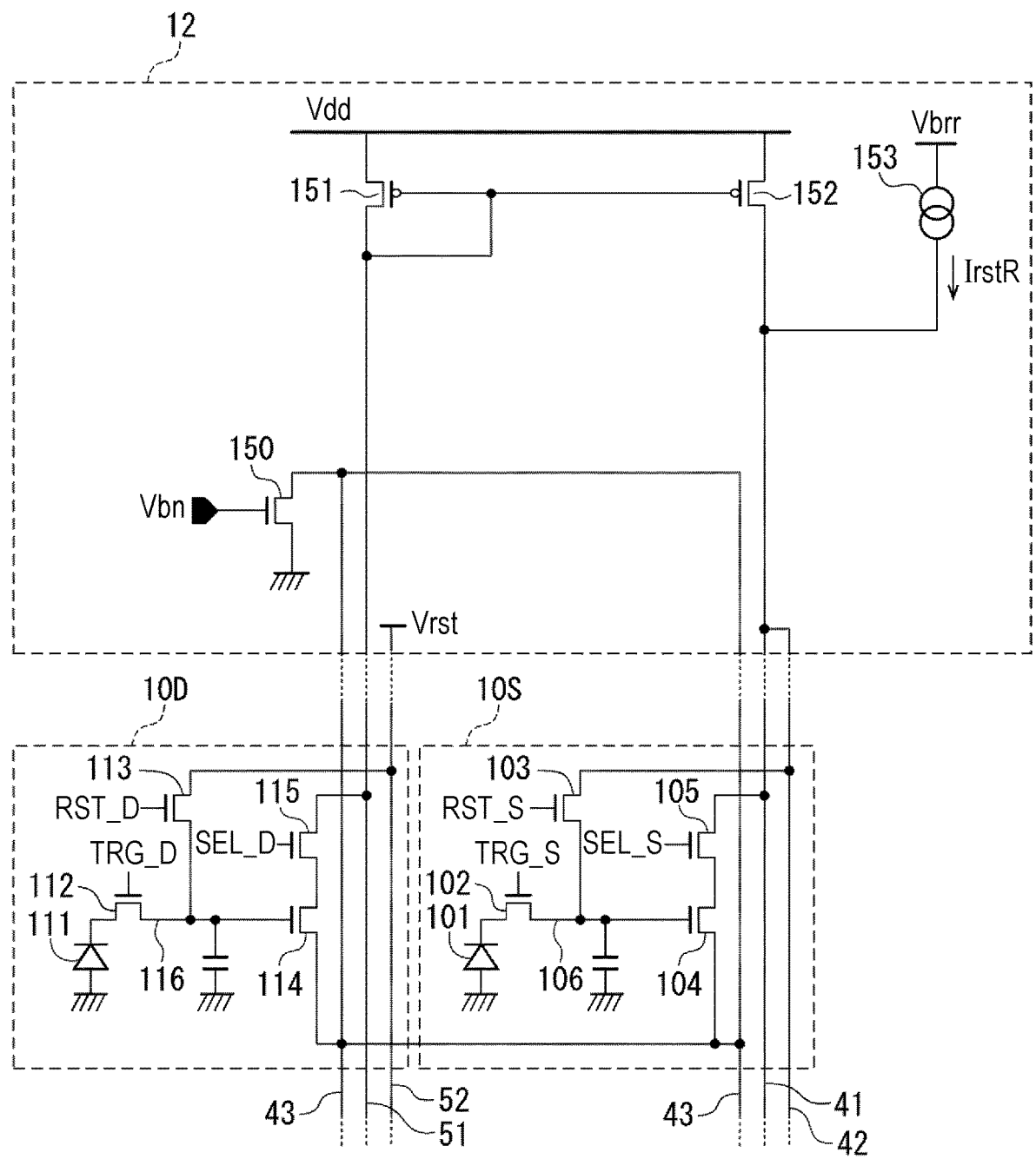
FIG. 5 is a diagram showing a second configuration example of the differential amplifier component.

FIG. 5 is a diagram showing a second configuration example of the differential amplifier component 12.

FIG. 5 also shows detailed configurations of the unit pixel 10S and the dummy pixel 10D disposed at the same pixel column. Additionally, in FIG. 5, the same reference numerals will be given to the parts common to those of the first configuration example shown in FIG. 3 and a description of the part will be appropriately omitted. The same applies to the description after the third configuration example to be described later.

The arrangement of the resetting constant current circuit 153 of the differential amplifier component 12 of the second configuration example of FIG. 5 is different from that of the first configuration example shown in FIG. 3. That is, in the differential amplifier component 12 of the first configuration example of FIG. 3, the resetting constant current circuit 153 is connected between the constant voltage source Vbrl and the drain of the PMOS load 151 and a current of the predetermined current value IrstL flows to the reference side column signal line 51. However, in the differential amplifier component 12 of the second configuration example, the resetting constant current circuit 153 is connected between the constant voltage source Vbrr and the drain of the PMOS load 152 and a current of the predetermined current value IrstR (IrstR1, IrstR2) flows to the signal side column signal line 41. The other configurations of FIG. 5 including the configurations of the unit pixel 10S and the dummy pixel 10D are similar to those of the first configuration example of FIG. 3.

Figure 6:
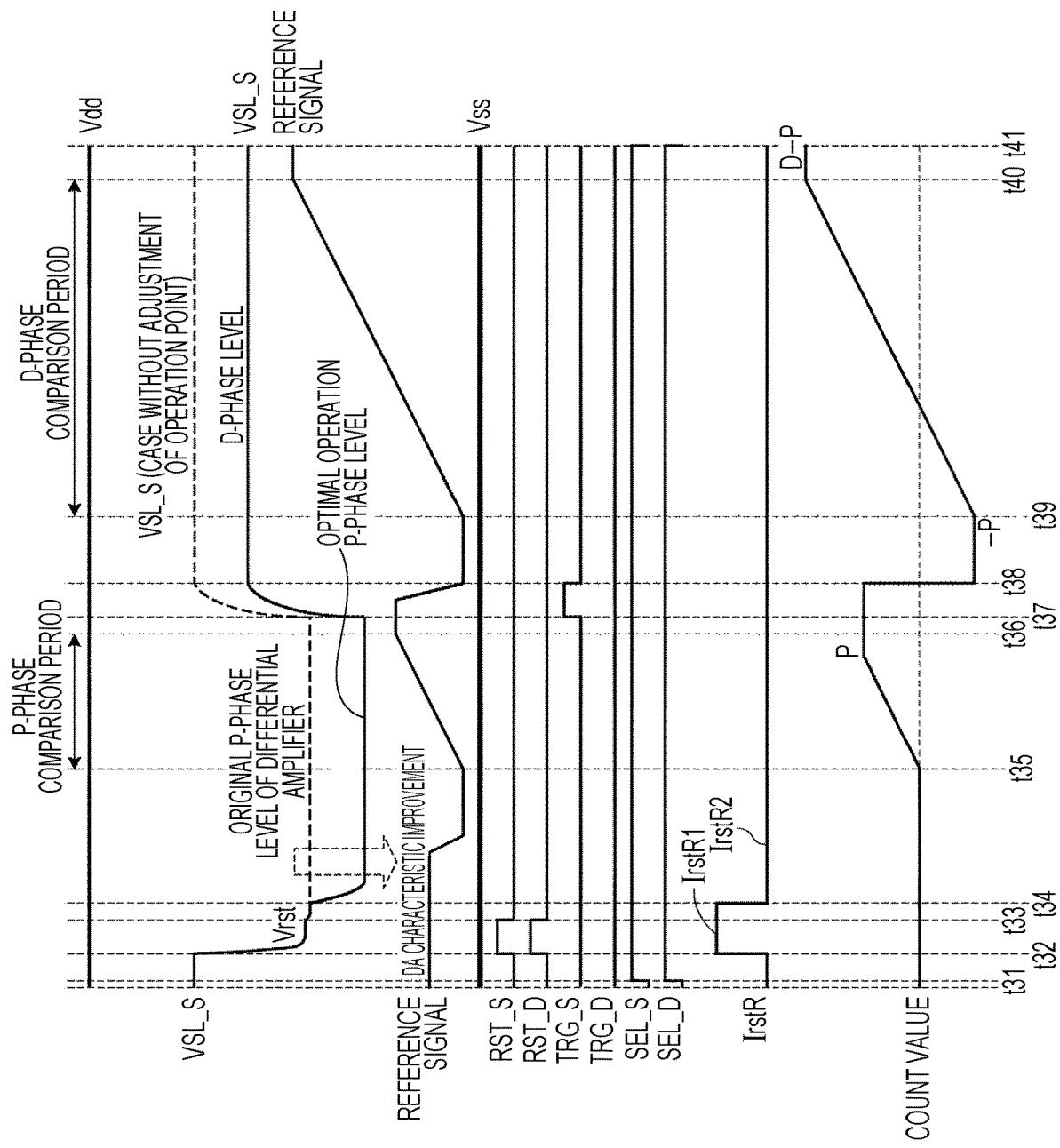
FIG. 6 is a timing chart showing an operation during a period 1H of the second configuration example.

FIG. 6 shows a timing chart of the unit pixel 10S and the dummy pixel 10D of the pixel array unit 11, the differential amplifier component 12 of the second configuration example, and the column signal processing unit 14 during a period 1H.

The timing chart of FIG. 6 corresponds to the timing chart of FIG. 4 of the first configuration example and the time t31 to the time t41 of FIG. 6 respectively correspond to the time t1 to the time t11 of FIG. 4. Also in FIG. 6, a description will be made by focusing on a part different from the timing chart of the first configuration example described in FIG. 4.

At the time t32 in which the resetting period starts, the reset control signals RST_S and RST_D are set to Hi and the reset transistor 103 of the unit pixel 10S and the reset transistor 113 of the dummy pixel 10D are turned on. At the same time, the resetting constant current circuit 153 changes the output current value IrstR to the first current value (the reset current value) IrstR1 (>IrstR2) larger than the second current value InstR2 kept so far.

At the next time t33, the reset control signals RST_S and RST_D are changed to Lo and the reset transistors 103 and 113 are turned off.

At the time t34 after a predetermined time elapses from the time t33, the current value IrstR output from the resetting constant current circuit 153 is returned from the first current value IrstR1 to the second current value InstR2 (<IrstR1) smaller than the first current value.

In this way, if the resetting constant current circuit 153 outputs the first current value IrstR1 so that a current larger than that of the reference side column signal line 51 is output to the signal side column signal line 41 during the resetting period, the original operation point (the operation start potential) of the differential amplifier can be adjusted to a potential smaller than the original operation point of the differential amplifier as shown in FIG. 6.

The operations at the other time (the time t31 and the time t35 to the time t41) are similar to those of the first configuration example described with reference to FIG. 4.

According to the differential amplifier component 12 of the second configuration example of FIG. 5, the resetting constant current circuit 153 outputs the first current value IrstR1 so that a current larger than that of the reference side column signal line 51 is output to the signal side column signal line 41 during the resetting period. Further, the resetting constant current circuit 153 outputs the second current value InstR2 smaller than the first current value IrstR1 during the reading period. In this way, if the resetting constant current circuit 153 generates a difference in current flowing to each of the signal side and the reference side of the differential pair during the resetting period to change a current flowing to the amplification transistors 114 and 104 between the resetting period and the reading period, the potential VSL_S of the column signal line 41 can be adjusted to the optimal operation point (operation range) of the differential amplifier at the downside (the low potential side) in relation to the original operation point of the differential amplifier as shown in FIG. 6. As a result, it is possible to improve linearity by improving the conversion efficiency of the amplification transistor 104.

5. Third Configuration Example of Differential Amplifier Component

Figure 7:
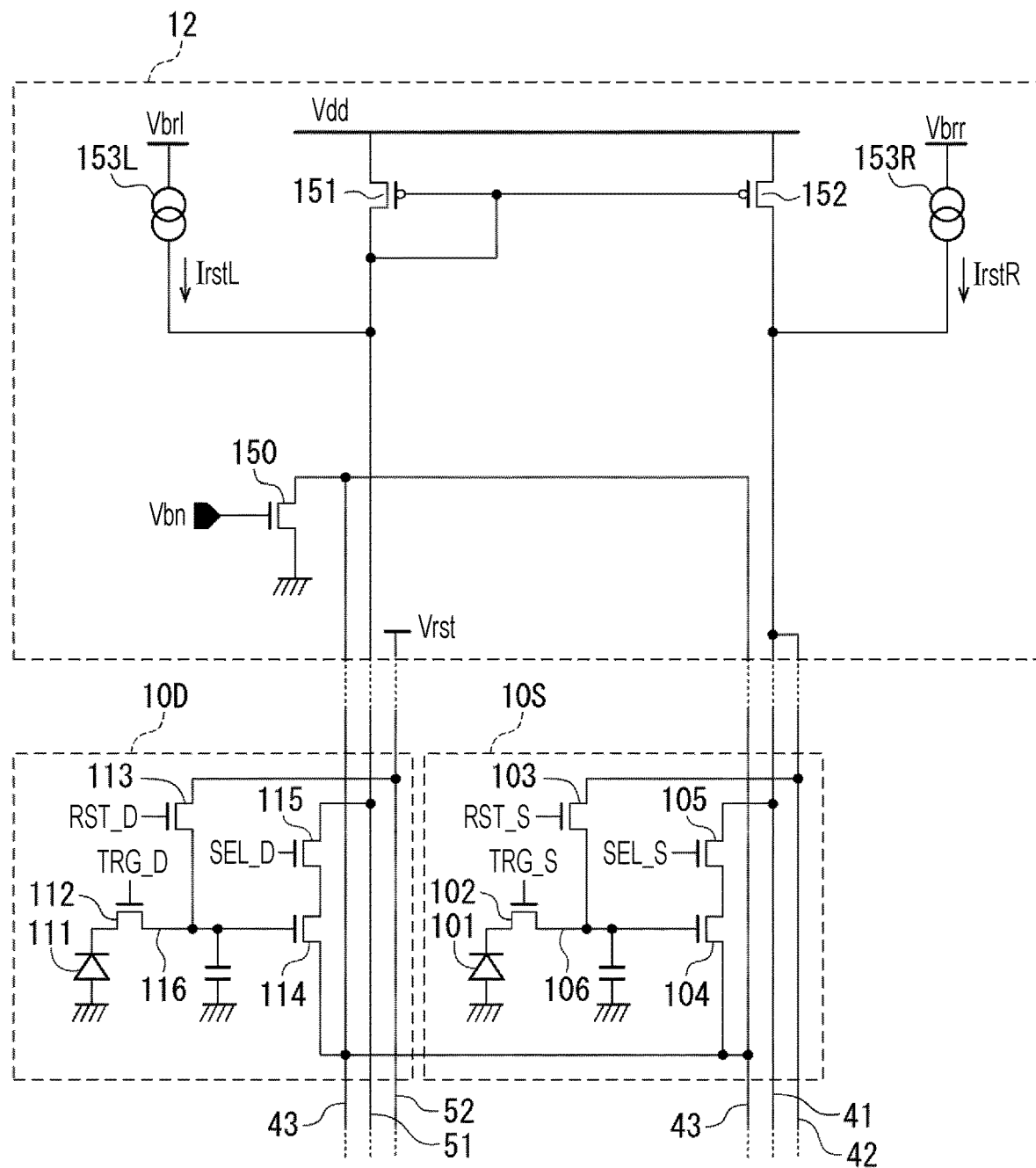
FIG. 7 is a diagram showing a third configuration example of the differential amplifier component.

FIG. 7 is a diagram showing a third configuration example of the differential amplifier component 12.

The differential amplifier component 12 of the third configuration example of FIG. 7 has both configurations of the first configuration example shown in FIG. 3 and the second configuration example shown in FIG. 5. That is, the differential amplifier component 12 of the third configuration example includes both a resetting constant current circuit 153L which is connected between the constant voltage source Vbrl and the drain of the PMOS load 151 and allows a current of the predetermined current value IrstL to flow to the reference side column signal line 51 and a resetting constant current circuit 153R which is connected between the constant voltage source Vbrr and the drain of the PMOS load 152 and allows a current of the predetermined current value IrstR to flow to the signal side column signal line 41. The other configurations of FIG. 7 including the configurations of the unit pixel 10S and the dummy pixel 10D are similar to those of the first configuration example and the second configuration example.

Figure 8:
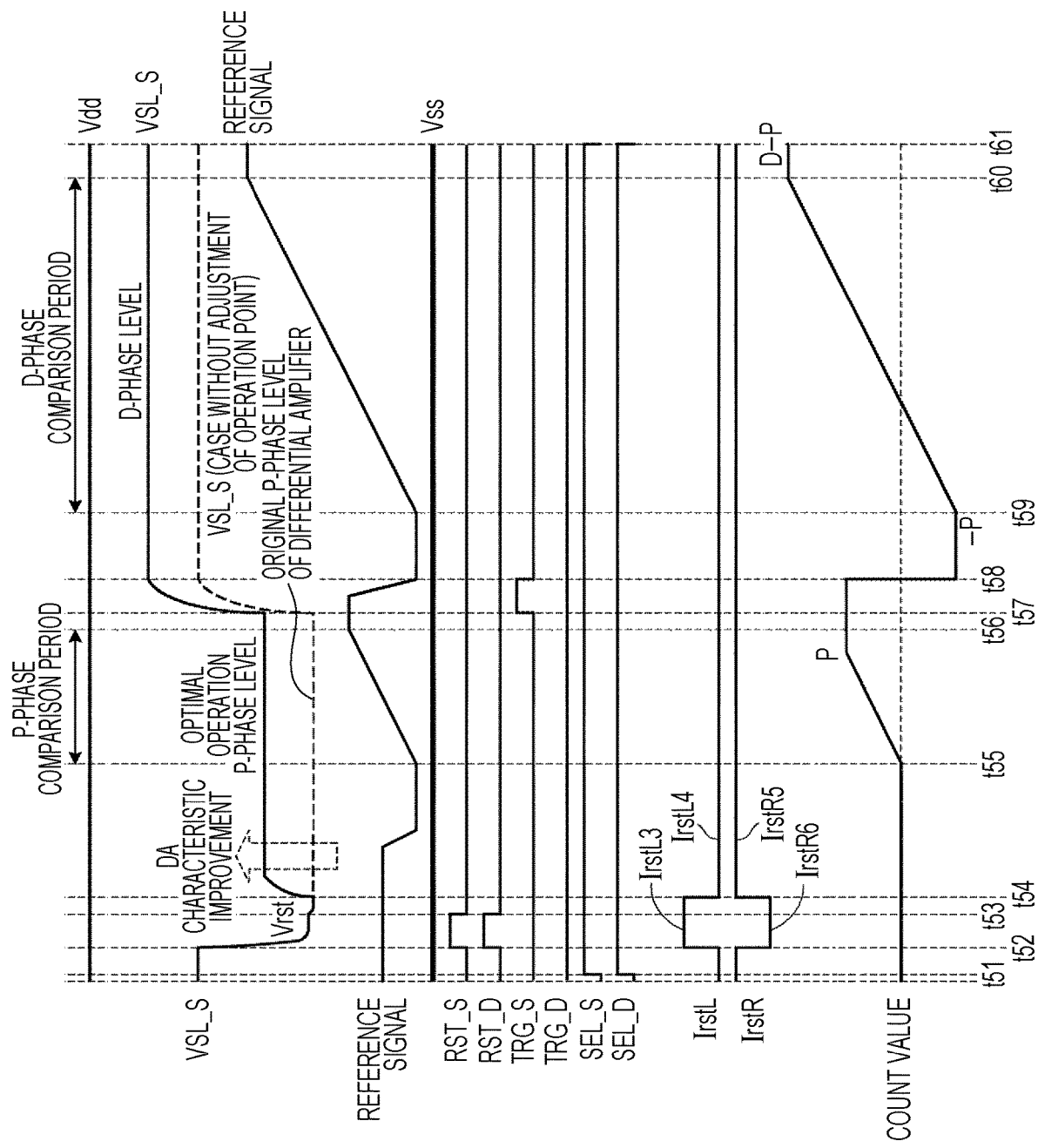
FIG. 8 is a timing chart showing an operation during a period 1H of the third configuration example.

FIG. 8 shows a timing chart of the unit pixel 10S and the dummy pixel 10D of the pixel array unit 11, the differential amplifier component 12 of the third configuration example, and the column signal processing unit 14 during a period 1H.

The timing chart of FIG. 8 corresponds to the timing chart of FIG. 4 of the first configuration example and the time t51 to the time t61 of FIG. 8 respectively correspond to the time t1 to the time t11 of FIG. 4. Also in FIG. 8, a description will be made by focusing on a part different from the timing chart of the first configuration example described in FIG. 4.

At the time t52 in which the resetting period starts, the reset control signals RST_S and RST_D are set to Hi and the reset transistor 103 of the unit pixel 10S and the reset transistor 113 of the dummy pixel 10D are turned on.

Further, at the time t52, the reference side resetting constant current circuit 153L changes the output current value IrstL to the first current value (the reset current value) IrstL3 (>IrstR4) larger than the second current value IrstL4 kept so far. At the same time, the signal side resetting constant current circuit 153R changes the output current value IrstR to the first current value (the reset current value) IrstR6 (<IrstR5) smaller than the second current value IrstR5 kept so far. With this configuration, the amount of the current flowing to the amplification transistor 114 of the dummy pixel 10D via the column signal line 51 becomes larger than the amount of the current flowing to the amplification transistor 104 of the unit pixel 10S via the column signal line 41.

At the next time t53, the reset control signals RST_S and RST_D are changed to Lo and the reset transistors 103 and 113 are turned off.

At the time t54 after a predetermined time elapses from the time t53, the reference side resetting constant current circuit 153L changes the output current value IrstL to the second current value IrstL4 (<IrstR3) smaller than the first current value (the reset current value) IrstL3 kept so far. At the same time, the signal side resetting constant current circuit 153R changes the output current value IrstR to the second current value IrstR5 (>IrstR6) larger than the first current value (the reset current value) IrstR6 kept so far.

The operations at the other time (the time t51 and the time t55 to the time t61) are similar to those of the first configuration example described with reference to FIG. 4.

The reference side resetting constant current circuit 153L allows a current of the first current value IrstL3 larger than before to flow and the signal side resetting constant current circuit 153R allows a current of the first current value IrstR6 smaller than before to flow so that the amount of the current flowing to the amplification transistor 114 of the dummy pixel 10D via the column signal line 51 becomes larger than the amount of the current flowing to the amplification transistor 104 of the unit pixel 10S via the column signal line 41 during a period from the time t52 to the time t54. With this configuration, as shown in FIG. 8, the potential VSL_S of the column signal line 41 can be adjusted to the optimal operation point (operation range) of the differential amplifier at the upside (the high potential side) in relation to the original operation point of the differential amplifier. As a result, it is possible to improve linearity by improving the conversion efficiency of the amplification transistor 104.

Additionally, according to the third configuration example, since the resetting constant current circuit 153 is provided at both the reference side and the signal side, the potential can be adjusted to the optimal operation point (operation range) of the differential amplifier at the downside (the low potential side) in relation to the original operation point of the differential amplifier.

Specifically, the reference side resetting constant current circuit 153L sets the output current value IrstL to the second current value IrstL4 (<IrstL3) having a small value during a period from the time t52 to the time t54 and sets the output current value to the first current value IrstL3 having a large value during other periods. The signal side resetting constant current circuit 153R sets the output current value IrstR to the first current value IrstR6 (>IrstR5) having a large value during a period from the time t52 to the time t54 and sets the output current value to the second current value IrstR6 having a small value during other periods.

With this configuration, the amount of the current flowing to the amplification transistor 104 of the unit pixel 10S via the column signal line 41 becomes larger than the amount of the current flowing to the amplification transistor 114 of the dummy pixel 10D via the column signal line 51 and the potential VSL_S of the column signal line 41 is adjusted to the downside (the low potential side) in relation to the original operation point of the differential amplifier.

6. Fourth Configuration Example of Differential Amplifier Component

Figure 9:
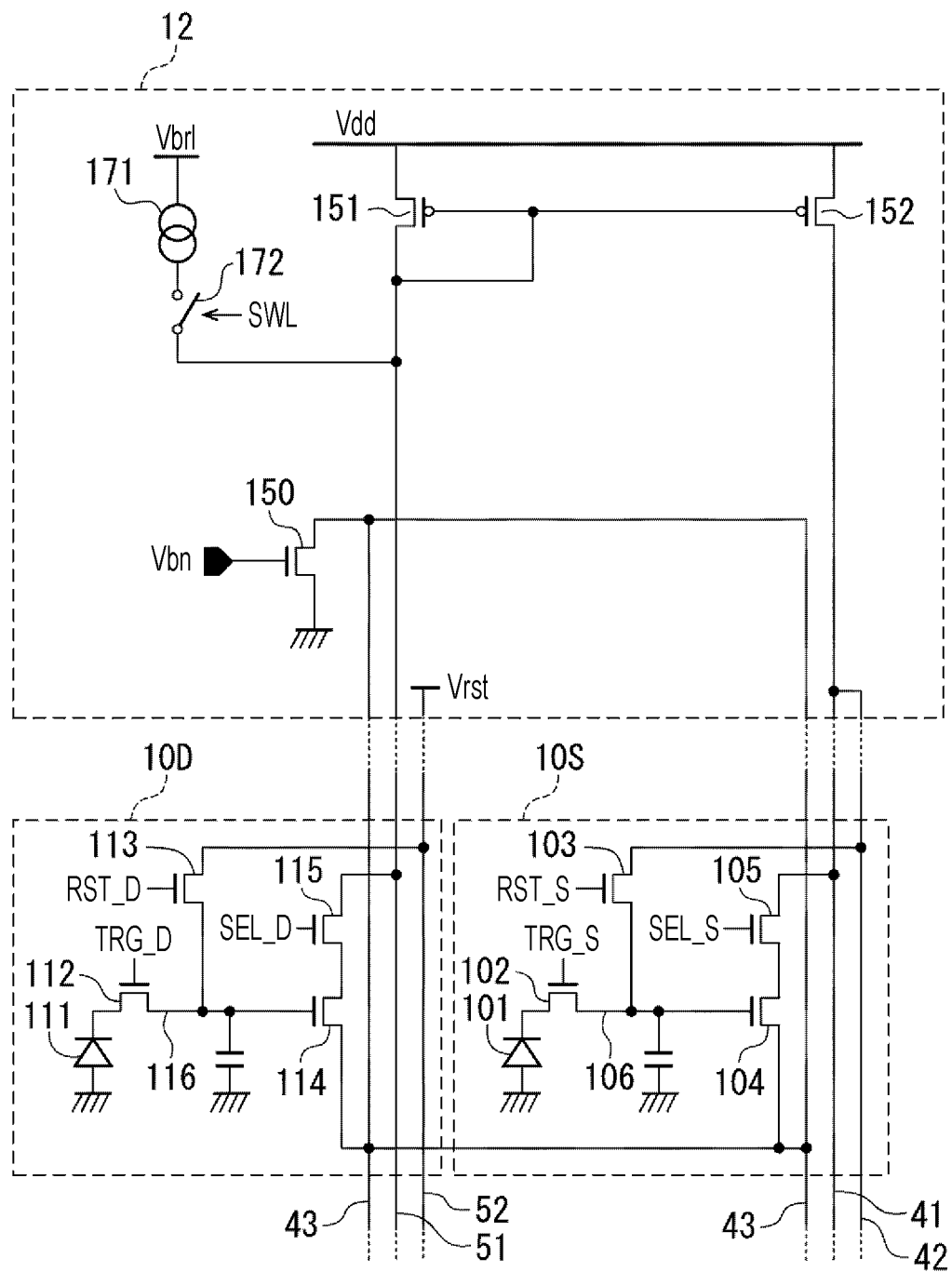
FIG. 9 is a diagram showing a fourth configuration example of the differential amplifier component.

FIG. 9 is a diagram showing a fourth configuration example of the differential amplifier component 12.

In the differential amplifier component 12 of the fourth configuration example of FIG. 9, the resetting constant current circuit 153 shown in FIG. 3 is replaced by a constant current source 171 and a switch 172. The constant current source 171 outputs a predetermined current. The switch 172 turns on and off the connection between the constant current source 171 and the column signal line 51 on the basis of the control signal SWL. The on/off state of the switch 172 changes between the resetting period and the reading period. The other configurations of FIG. 9 including the configurations of the unit pixel 10S and the dummy pixel 10D are similar to those of the first configuration example.

Figure 10:
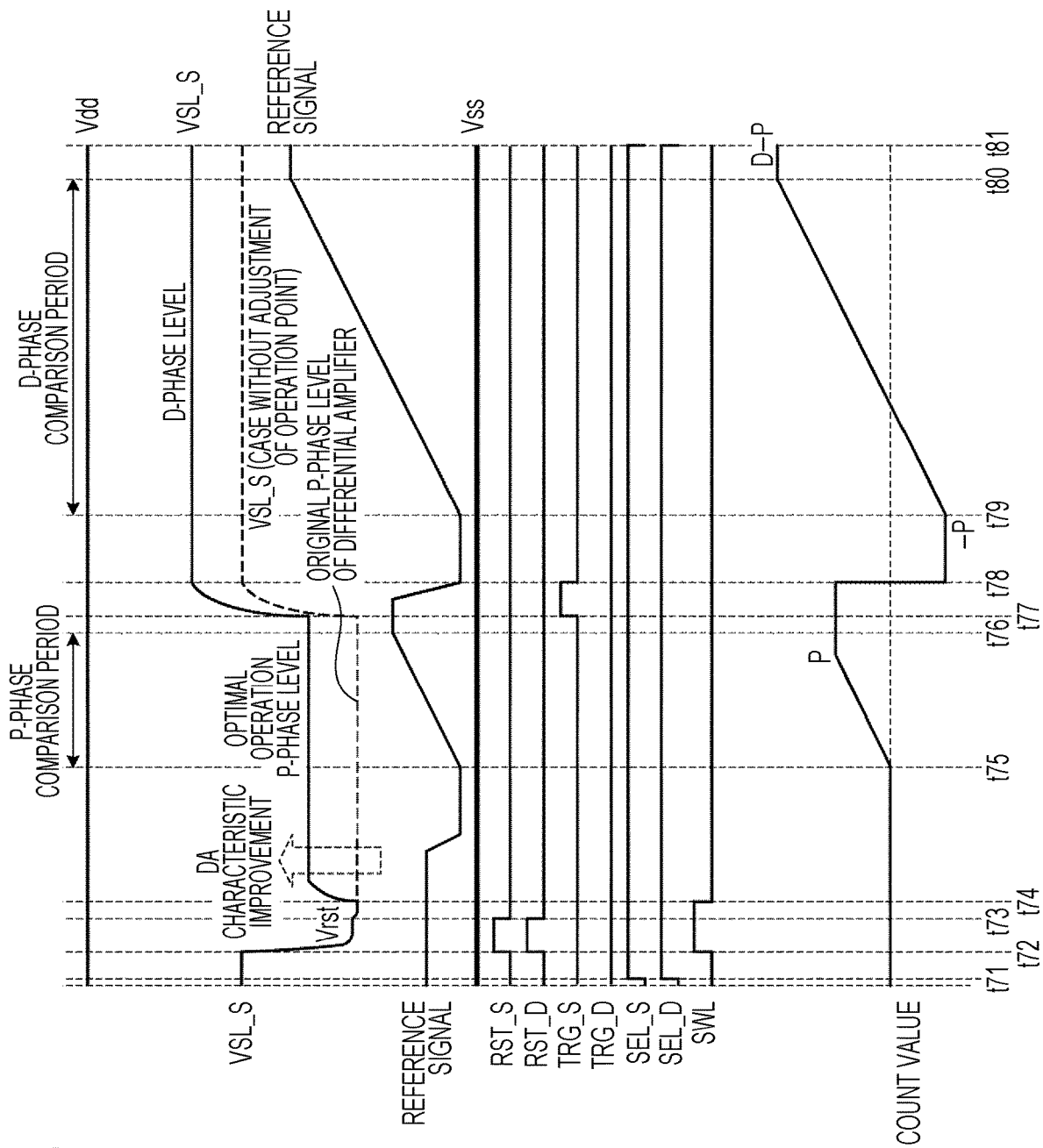
FIG. 10 is a timing chart showing an operation during a period 1H of the fourth configuration example.

FIG. 10 shows a timing chart of the unit pixel 10S and the dummy pixel 10D of the pixel array unit 11, the differential amplifier component 12 of the fourth configuration example, and the column signal processing unit 14 during a period 1H.

The timing chart of FIG. 10 corresponds to the timing chart of FIG. 4 of the first configuration example and the time t71 to the time t81 of FIG. 10 respectively correspond to the time t1 to the time t11 of FIG. 4. Also in FIG. 10, a description will be made by focusing on a part different from the timing chart of the first configuration example described in FIG. 4.

At the time t72 in which the resetting period starts, the reset control signals RST_S and RST_D are set to Hi and the reset transistor 103 of the unit pixel 10S and the reset transistor 113 of the dummy pixel 10D are turned on.

Further, at the time t72, the control signal SWL of Hi is supplied to the switch 172 so that the switch 172 connects the constant current source 171 and the column signal line 51 to each other. With this configuration, a predetermined current flows from the constant current source 171 to the reference side column signal line 51.

At the next time t73, the reset control signals RST_S and RST_D are changed to Lo and the reset transistors 103 and 113 are turned off.

At the time t74 after a predetermined time elapses from the time t73, the control signal SWL is changed from Hi to Lo and the switch 172 is turned off so that the constant current source 171 is separated from the column signal line 51.

The operations at the other time (the time t71 and the time t75 to the time t81) are similar to those of the first configuration example described with reference to FIG. 4.

If the constant current source 171 is connected to the column signal line 51 during a period from the time t72 to the time t74, the amount of the current flowing to the amplification transistor 114 of the dummy pixel 10D via the column signal line 51 becomes larger than the amount of the current flowing to the amplification transistor 104 of the unit pixel 10S via the column signal line 41. With this configuration, as shown in FIG. 10, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

7. Fifth Configuration Example of Differential Amplifier Component

Figure 11:
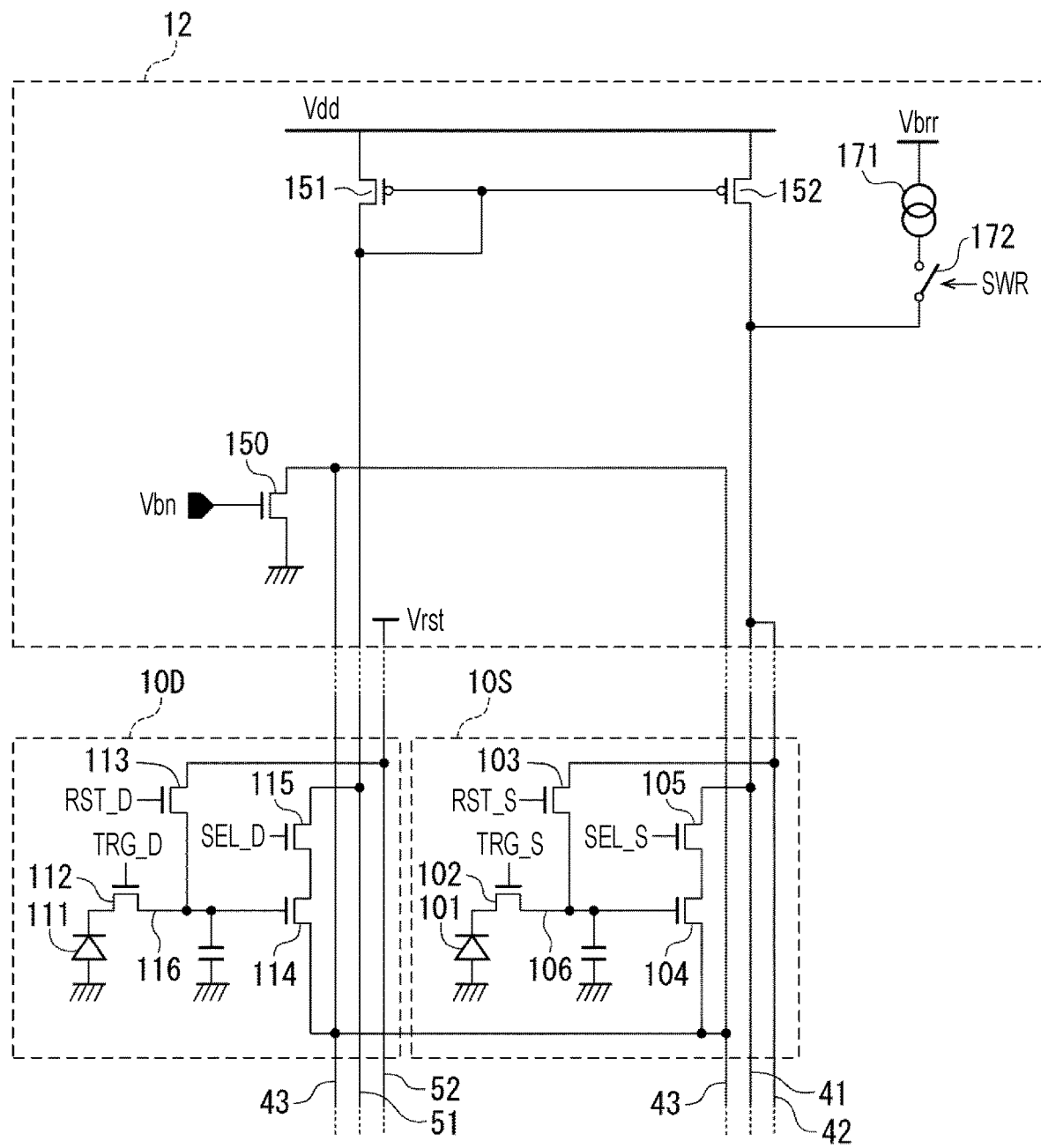
FIG. 11 is a diagram showing a fifth configuration example of the differential amplifier component.

FIG. 11 is a diagram showing a fifth configuration example of the differential amplifier component 12.

In the differential amplifier component 12 of the fifth configuration example of FIG. 11, the resetting constant current circuit 153 shown in FIG. 5 is replaced by the constant current source 171 and the switch 172. In other words, in the differential amplifier component 12 of the fifth configuration example, the constant current source 171 and the switch 172 of the fourth configuration example shown in FIG. 9 are provided at the signal side instead of the reference side. The switch 172 turns on and off the connection between the constant current source 171 and the column signal line 41 on the basis of the control signal SWR. The on/off state of the switch 172 changes between the resetting period and the reading period. The other configurations of FIG. 11 including the configurations of the unit pixel 10S and the dummy pixel 10D are similar to those of the fourth configuration example of FIG. 9.

Figure 12:
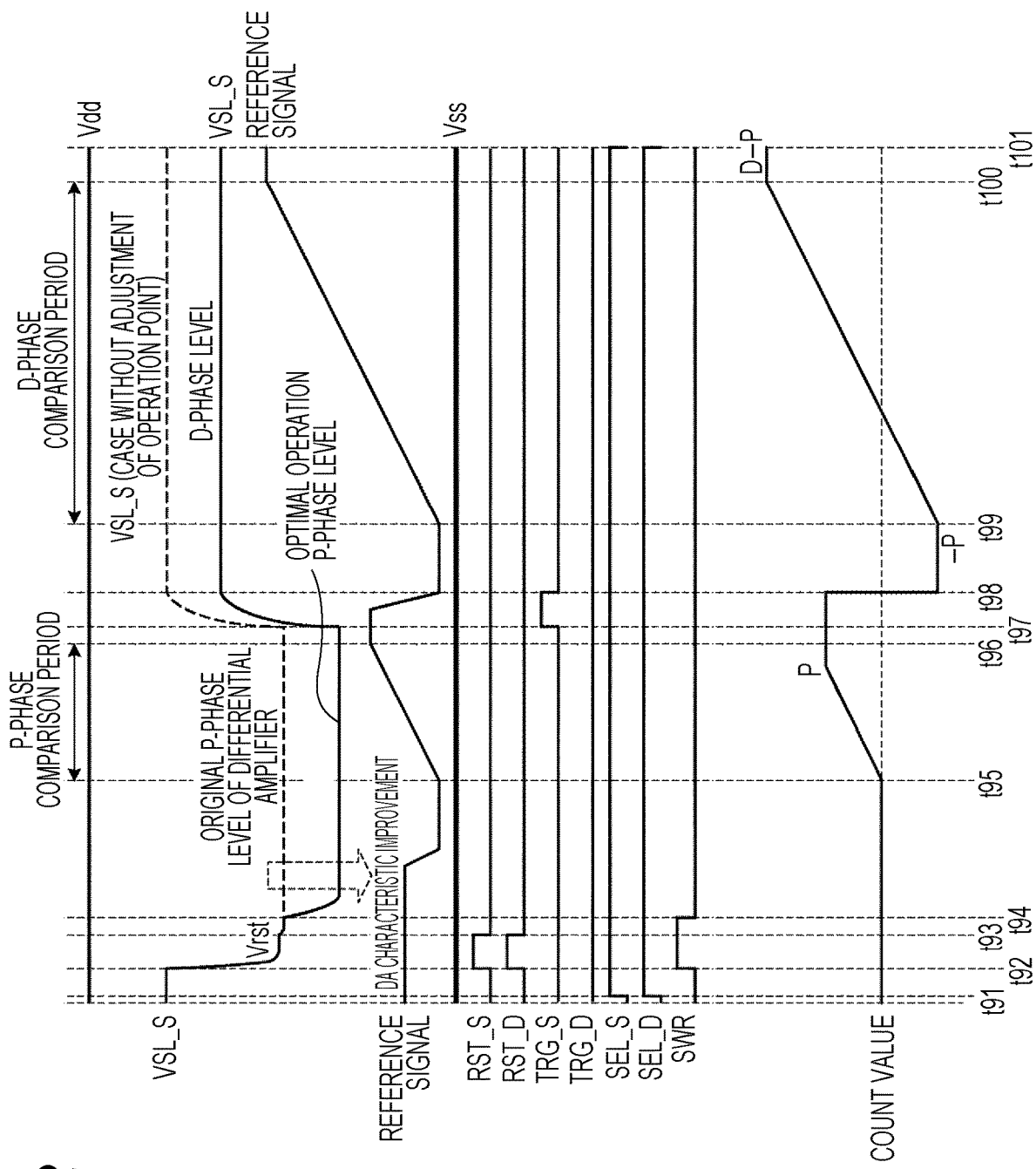
FIG. 12 is a timing chart showing an operation during a period 1H of the fifth configuration example.

FIG. 12 shows a timing chart of the unit pixel 10S and the dummy pixel 10D of the pixel array unit 11, the differential amplifier component 12 of the fifth configuration example, and the column signal processing unit 14 during a period 1H.

The timing chart of FIG. 12 corresponds to the timing chart of FIG. 6 of the second configuration example and the time t91 to the time t101 respectively correspond to the time t31 to the time t41 of FIG. 6. Also in FIG. 12, a description will be made by focusing on a part different from the timing chart of the second configuration example described with reference to FIG. 6.

At the time t92 in which the resetting period starts, the reset control signals RST_S and RST_D are set to Hi and the reset transistor 103 of the unit pixel 10S and the reset transistor 113 of the dummy pixel 10D are turned on.

Further, at the time t92, the control signal SWR of Hi is supplied to the switch 172 so that the switch 172 connects the constant current source 171 and the column signal line 41 to each other. With this configuration, a predetermined current flows from the constant current source 171 to the signal side column signal line 41.

At the next time t93, the reset control signals RST_S and RST_D are changed to Lo and the reset transistors 103 and 113 are turned off.

At the time t94 after a predetermined time elapses from the time t93, the control signal SWR is changed from Hi to Lo and the switch 172 is turned off so that the constant current source 171 is separated from the column signal line 41.

The operations at the other time (the time t91 and the time t95 to the time t101) are similar to those of the second configuration example described with reference to FIG. 6.

If the constant current source 171 is connected to the column signal line 41 during a period from the time t92 to the time t94, the amount of the current flowing to the amplification transistor 104 of the unit pixel 10S via the column signal line 41 becomes larger than the amount of the current flowing to the amplification transistor 114 of the dummy pixel 10D via the column signal line 51. With this configuration, as shown in FIG. 12, the potential VSL_S of the column signal line 41 can be adjusted to the optimal operation point (operation range) of the differential amplifier located at the downside (the low potential side) in relation to the original operation point of the differential amplifier. As a result, it is possible to improve linearity by improving the conversion efficiency of the amplification transistor 104.

8. Sixth Configuration Example of Differential Amplifier Component

Figure 13:
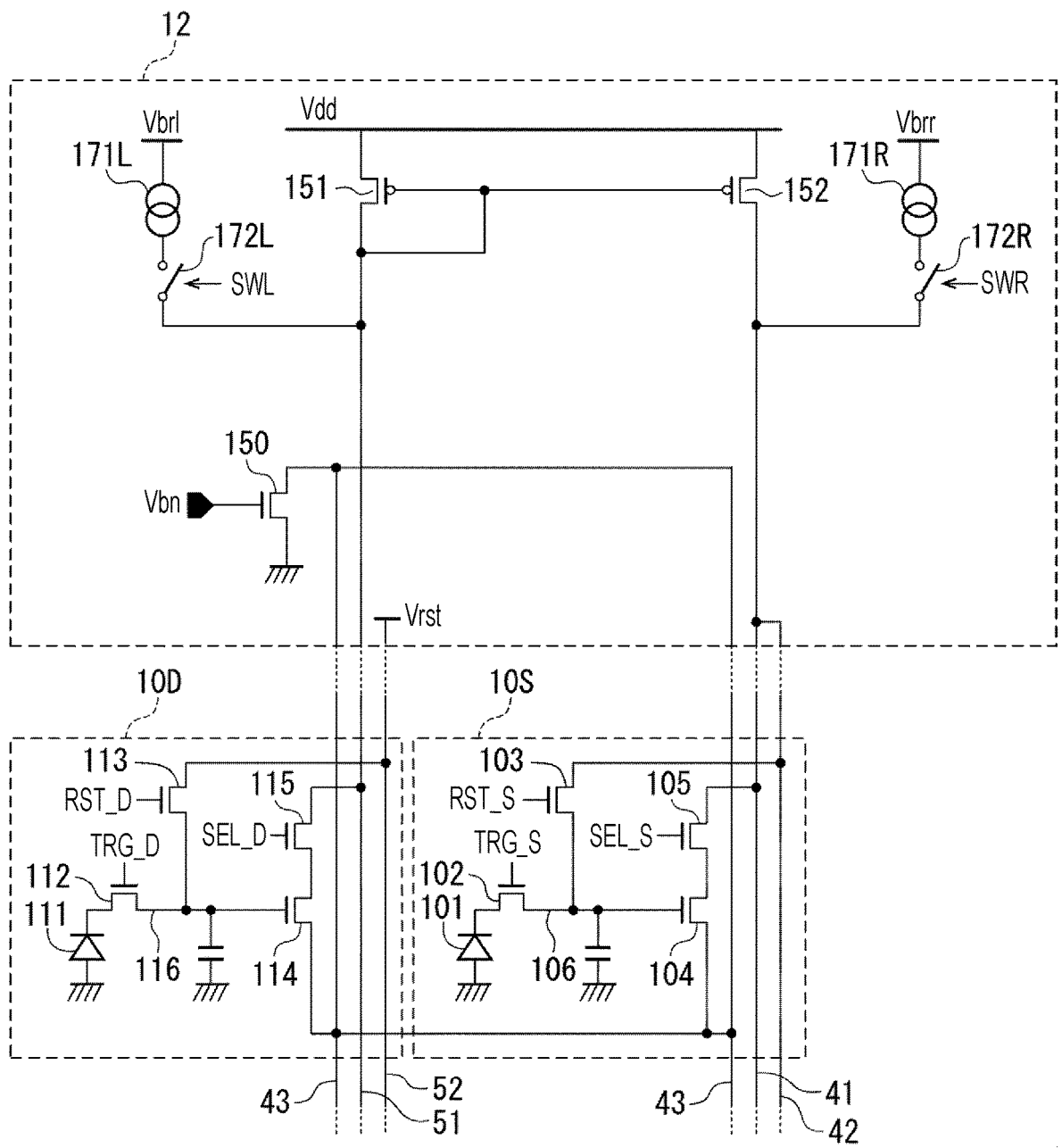
FIG. 13 is a diagram showing a sixth configuration example of the differential amplifier component.

FIG. 13 is a diagram showing a sixth configuration example of the differential amplifier component 12.

The differential amplifier component 12 of the sixth configuration example of FIG. 13 has both configurations of the fourth configuration example shown in FIG. 9 and the fifth configuration example shown in FIG. 11. That is, the differential amplifier component 12 of the sixth configuration example includes both a constant current source 171L and a switch 172L connected between the constant voltage source Vbrl and the drain of the PMOS load 151 and a constant current source 171R and a switch 172R connected between the constant voltage source Vbrr and the drain of the PMOS load 152. The switch 172L turns on and off the connection between the constant current source 171L and the column signal line 51 on the basis of the control signal SWL. The switch 172R turns on and off the connection between the constant current source 171R and the column signal line 41 on the basis of the control signal SWR. The on/off states of the switch 172L and 172R change between the resetting period and the reading period. The other configurations of FIG. 13 including the configurations of the unit pixel 10S and the dummy pixel 10D are similar to those of the fourth configuration example and the fifth configuration example.

Figure 14:
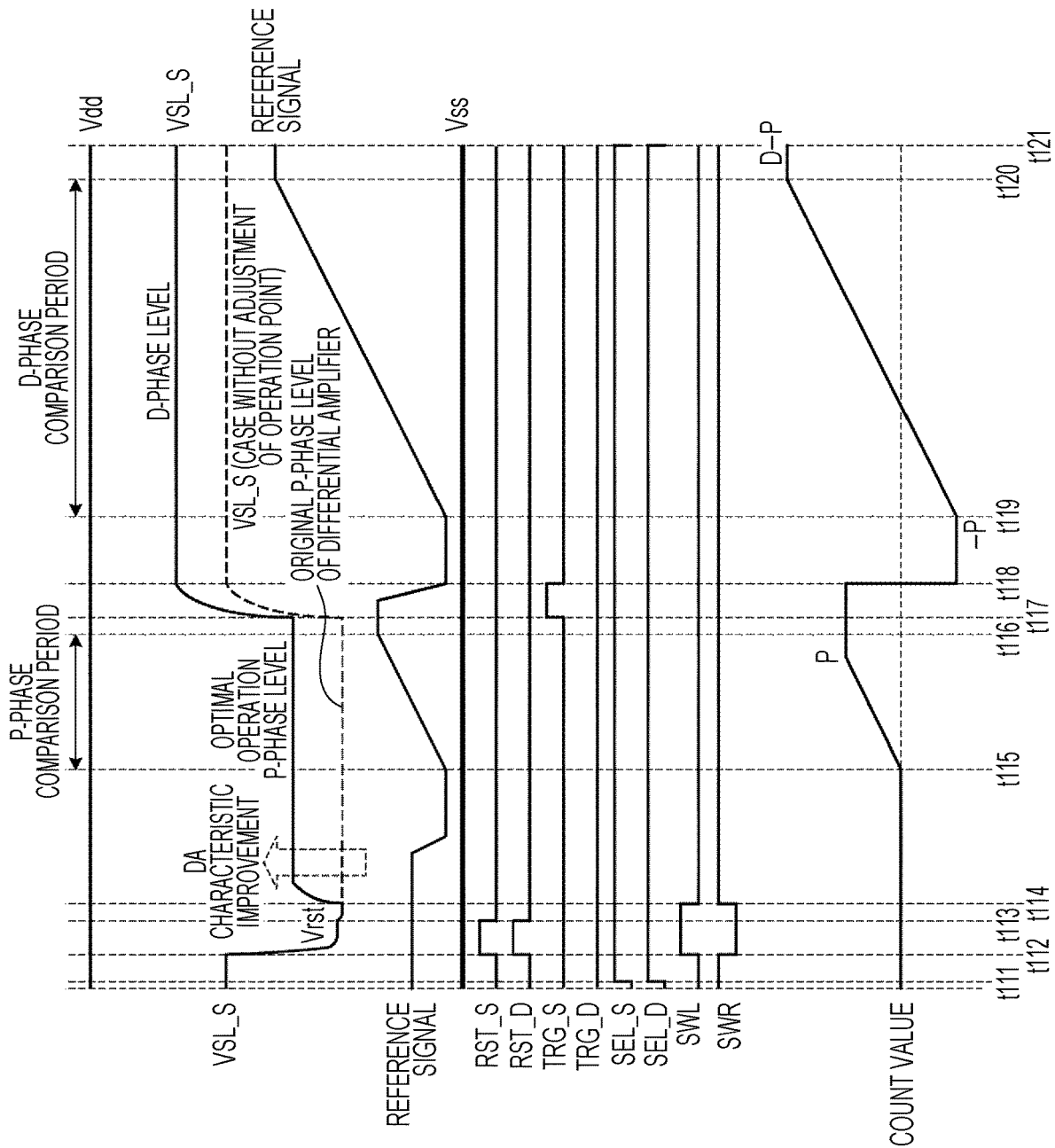
FIG. 14 is a timing chart showing an operation during a period 1H of the sixth configuration example.

FIG. 14 shows a timing chart of the unit pixel 10S and the dummy pixel 10D of the pixel array unit 11, the differential amplifier component 12 of the sixth configuration example, and the column signal processing unit 14 during a period 1H.

The timing chart of FIG. 14 corresponds to the timing chart of FIG. 8 of the third configuration example and the time t111 to the time t121 respectively correspond to the time t51 to the time t61 of FIG. 8. Also in FIG. 14, a description will be made by focusing on a part different from the timing chart of the third configuration example described with reference to FIG. 8.

At the time t112 in which the resetting period starts, the reset control signals RST_S and RST_D are set to Hi and the reset transistor 103 of the unit pixel 10S and the reset transistor 113 of the dummy pixel 10D are turned on.

Further, at the time t112, the control signal SWL of Hi is supplied to the switch 172L so that the switch 172L connects the constant current source 171L and the column signal line 51 to each other. With this configuration, a predetermined current flows from the constant current source 171L to the reference side column signal line 51.

At the same time t112, the control signal SWR of Lo is supplied to the switch 172R so that the switch 172R separates the constant current source 171R from the column signal line 41. With this configuration, a current flowing from the constant current source 171R so far does not flow to the signal side column signal line 41.

At the next time t113, the reset control signals RST_S and RST_D are changed to Lo and the reset transistors 103 and 113 are turned off.

At the time t114 after a predetermined time elapses from the time t113, the control signal SWL is changed from Hi to Lo and the switch 172L is turned off so that the constant current source 171L is separated from the column signal line 51. With this configuration, a current does not flow from the constant current source 171L to the reference side column signal line 51. Further, at the time t114, the control signal SWR is changed from Lo to Hi and the switch 172R is turned on so that the constant current source 171R is connected to the column signal line 41. With this configuration, a predetermined current flows from the constant current source 171R to the signal side column signal line 41.

The operations at the other time (the time t111 and the time t115 to the time t121) are similar to those of the first configuration example described with reference to FIG. 4.

If the constant current source 171L is connected to the column signal line 51 and the constant current source 171R is separated from the column signal line 41 during a period from the time t112 to the time t114, the amount of the current flowing to the amplification transistor 114 of the dummy pixel 10D via the column signal line 51 becomes larger than the amount of the current flowing to the amplification transistor 104 of the unit pixel 10S via the column signal line 41. With this configuration, as shown in FIG. 14, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

Additionally, according to the sixth configuration example, since the constant current source 171 and the switch 172 are provided at both the reference side and the signal side, the potential can be adjusted to the optimal operation point (operation range) of the differential amplifier located at the downside (the low potential side) in relation to the original operation point of the differential amplifier.

Specifically, the differential amplifier component 12 changes the control signal SWL to Lo and changes the control signal SWR to Hi so that the constant current source 171L is separated from the column signal line 51 and the constant current source 171R is connected to the column signal line 41 during a period from the time t112 to the time t114. With this configuration, the amount of the current flowing to the amplification transistor 104 of the unit pixel 10S via the column signal line 41 becomes larger than the amount of the current flowing to the amplification transistor 114 of the dummy pixel 10D via the column signal line 51. With this configuration, the potential VSL_S of the column signal line 41 can be adjusted to the optimal operation point (operation range) of the differential amplifier located at the downside (the low potential side) in relation to the original operation point of the differential amplifier. As a result, it is possible to improve linearity by improving the conversion efficiency of the amplification transistor 104.

9. Seventh Configuration Example of Differential Amplifier Component

Figure 15:
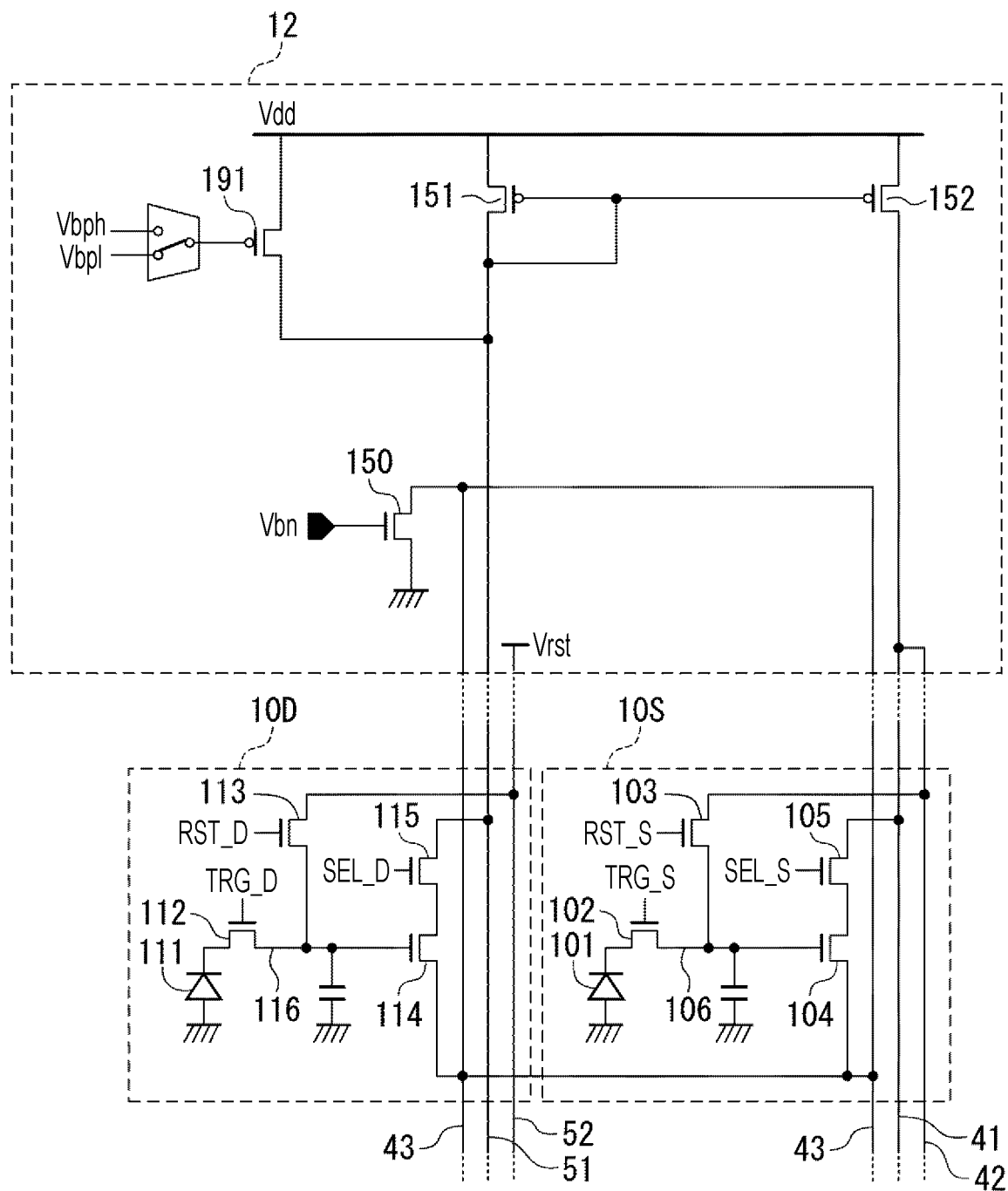
FIG. 15 is a diagram showing a seventh configuration example of the differential amplifier component.

FIG. 15 is a diagram showing a seventh configuration example of the differential amplifier component 12.

In the differential amplifier component 12 of the seventh configuration example shown in FIG. 15, a resetting PMOS transistor 191 is provided instead of the resetting constant current circuit 153 of the first configuration example shown in FIG. 3. The source of the resetting PMOS transistor 191 is connected to the constant voltage source Vdd and the drain of the resetting PMOS transistor 191 is connected to the column signal line 51 and the drain of the PMOS load 151. The control signal Vbph of Hi or the control signal Vbpl of Lo is supplied to the gate of the resetting PMOS transistor 191.

The operation of the seventh configuration example of FIG. 15 will be described with reference to the flowchart of FIG. 4. That is, when the control signal Vbpl of Lo is supplied to the gate of the resetting PMOS transistor 191 to turn on the resetting PMOS transistor 191 at the same time when the reset transistor 103 of the unit pixel 10S and the reset transistor 113 of the dummy pixel 10D are turned on during a period from the time t2 to the time t4, a predetermined current flows from the resetting PMOS transistor 191 to the reference side column signal line 51. In other periods, since the control signal Vbph of Hi is supplied to the gate of the resetting PMOS transistor 191 to turn off the resetting PMOS transistor 191, a current does not flow from the resetting PMOS transistor 191 to the reference side column signal line 51.

With this configuration, as shown in FIG. 4, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

10. Eighth Configuration Example of Differential Amplifier Component

Figure 16:
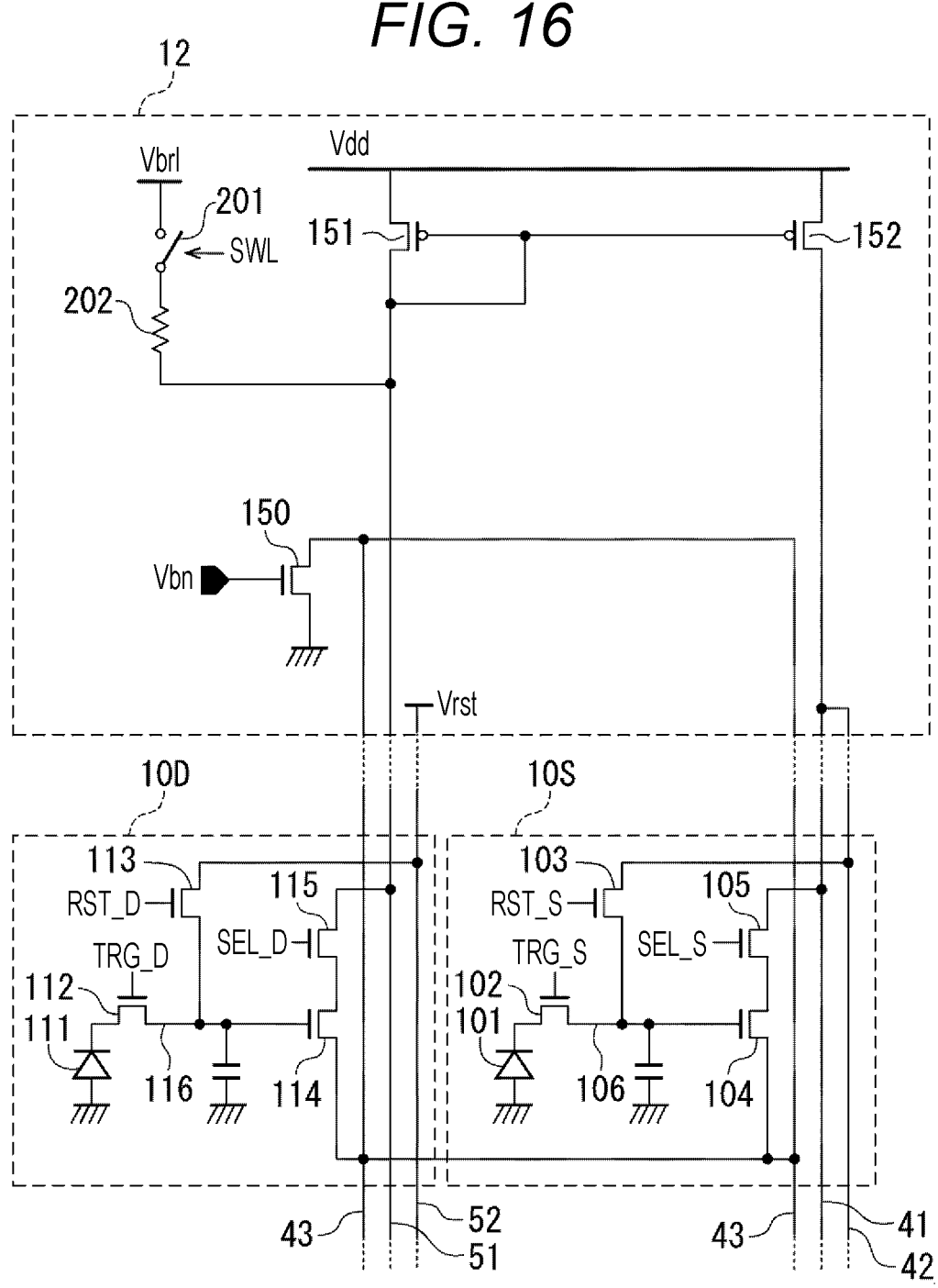
FIG. 16 is a diagram showing an eighth configuration example of the differential amplifier component.

FIG. 16 is a diagram showing an eighth configuration example of the differential amplifier component 12.

In the differential amplifier component 12 of the eighth configuration example of FIG. 16, a switch 201 and a resistor 202 which are connected in series to each other are provided instead of the resetting constant current circuit 153 of the first configuration example shown in FIG. 3. The other end different from the side of the resistor 202 in the switch 201 is connected to the constant voltage source Vbrl. The other end different from the side of the switch 201 in the resistor 202 is connected to the column signal line 51 and the drain of the PMOS load 151. The switch 201 turns on and off the connection between the constant voltage source Vbrl and the resistor 202 on the basis of the control signal SWL.

The operation of the eighth configuration example of FIG. 16 will be described with reference to the flowchart of FIG. 4. That is, when the control signal SWL of Hi is supplied to the switch 201 to turn on the switch 201 at the same time when the reset transistor 103 of the unit pixel 10S and the reset transistor 113 of the dummy pixel 10D are turned on during a period from the time t2 to the time t4, a predetermined current flows from the resistor 202 to the reference side column signal line 51. In other periods, since the control signal SWL of Lo is supplied to the switch 201 to turn off the switch 201, a current does not flow from the resistor 202 to the reference side column signal line 51.

With this configuration, as shown in FIG. 4, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

11. Ninth Configuration Example of Differential Amplifier Component

Figure 17:
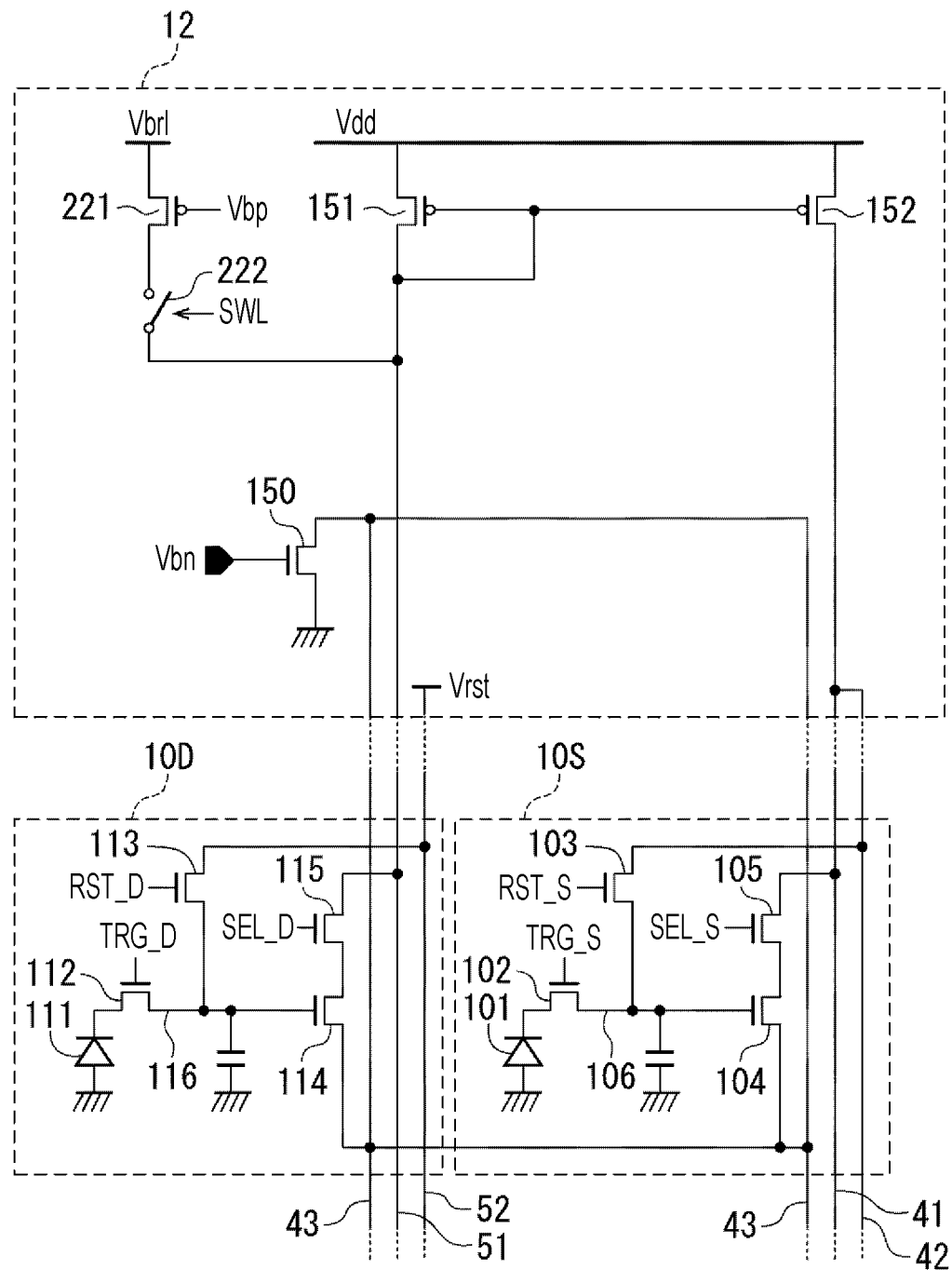
FIG. 17 is a diagram showing a ninth configuration example of the differential amplifier component.

FIG. 17 is a diagram showing a ninth configuration example of the differential amplifier component 12.

In the differential amplifier component 12 of the ninth configuration example of FIG. 17, a reset element comprising a resetting PMOS transistor 221 and a switch 222 are provided instead of the resetting constant current circuit 153 of the first configuration example shown in FIG. 3.

The source of the resetting PMOS transistor 221 is connected to the constant voltage source Vbrl and the drain of the resetting PMOS transistor 221 is connected to the column signal line 51 and the drain of the PMOS load 151 via the switch 222. A bias voltage Vbp for turning on the resetting PMOS transistor 221 is normally supplied to the gate of the resetting PMOS transistor 221. The switch 222 turns on and off the connection between the drain of the resetting PMOS transistor 221 and the column signal line 51 and the drain of the PMOS load 151 on the basis of the control signal SWL.

The operation of the ninth configuration example of FIG. 17 will be described with reference to the flowchart of FIG. 4. That is, when the control signal SWL of Hi is supplied to the switch 222 to turn on the switch 222 at the same time when the reset transistor 103 of the unit pixel 10S and the reset transistor 113 of the dummy pixel 10D are turned on during a period from the time t2 to the time t4, a predetermined current flows from the resetting PMOS transistor 221 to the reference side column signal line 51. In other periods, since the control signal SWL of Lo is supplied to the switch 222 to turn off the switch 222, a current does not flow from the resetting PMOS transistor 221 to the reference side column signal line 51.

With this configuration, as shown in FIG. 4, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

12. Tenth Configuration Example of Differential Amplifier Component

Figure 18:
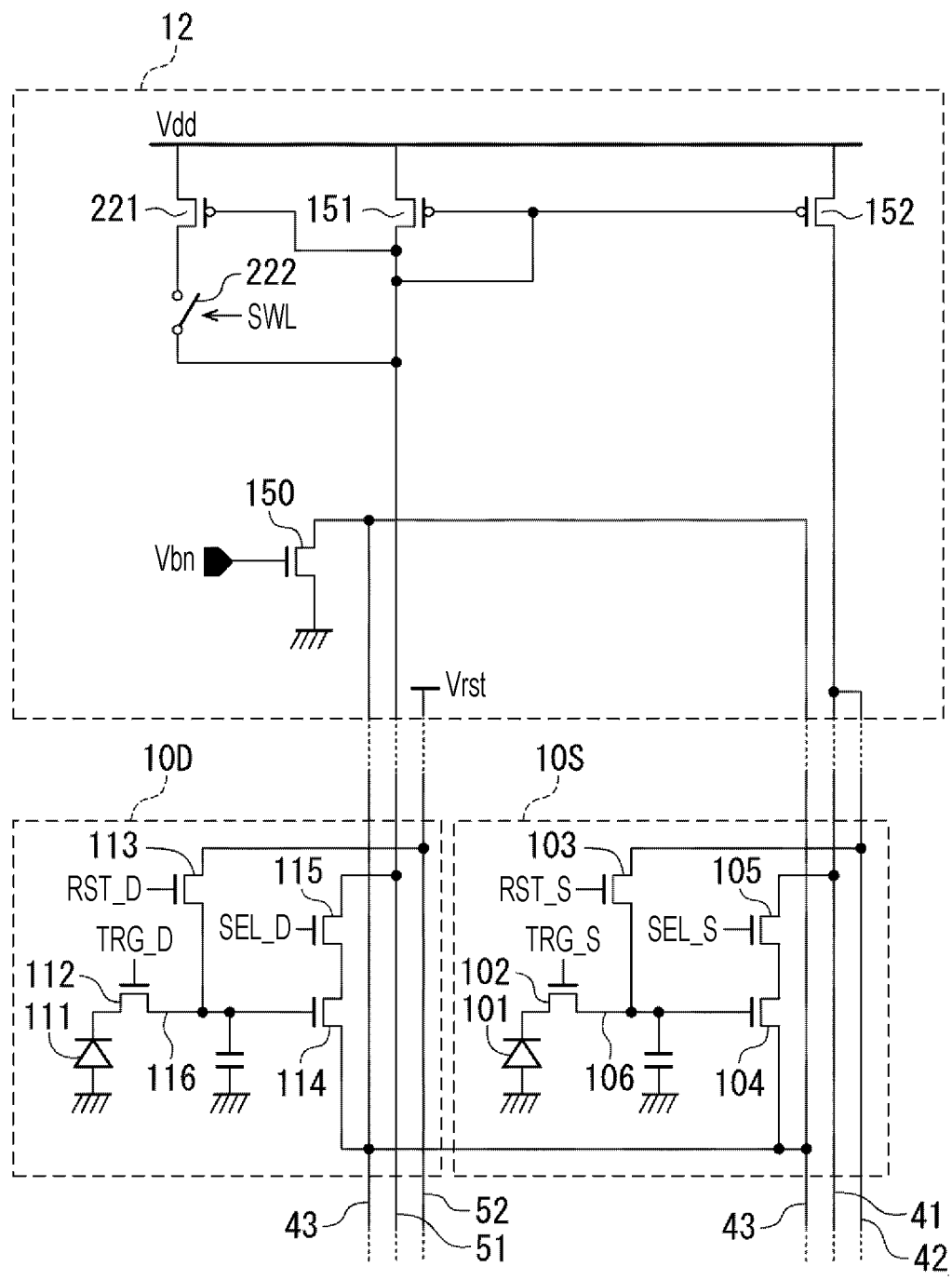
FIG. 18 is a diagram showing a tenth configuration example of the differential amplifier component.

FIG. 18 is a diagram showing a tenth configuration example of the differential amplifier component 12.

In the differential amplifier component 12 of the tenth configuration example of FIG. 18, the gate of the resetting PMOS transistor 221 of the ninth configuration example shown in FIG. 17 is connected to the column signal line 51, the drain and the gate of the PMOS load 151, and the gate of the PMOS load 152. In this case, there is an advantage that the bias voltage Vbp applied to the gate of the resetting PMOS transistor 221 is not necessary compared to the ninth configuration example.

Since the operation of the tenth configuration example is similar to that of the ninth configuration example, a description will be omitted.

Also in the tenth configuration example, similarly to the ninth configuration example, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

13. Eleventh Configuration Example of Differential Amplifier Component

Figure 19:
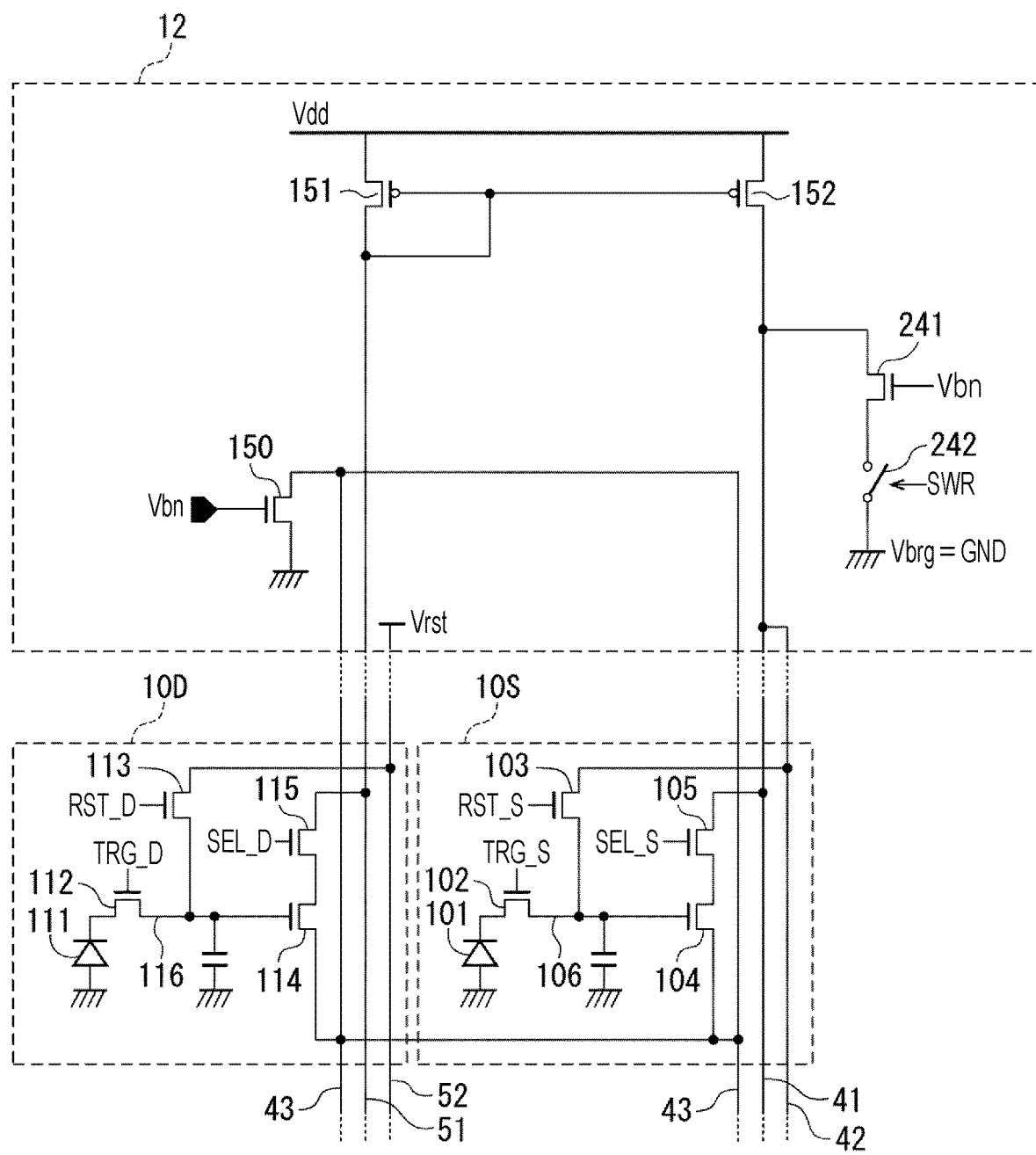
FIG. 19 is a diagram showing an eleventh configuration example of the differential amplifier component.

FIG. 19 is a diagram showing an eleventh configuration example of the differential amplifier component 12.

In the differential amplifier component 12 of the eleventh configuration example of FIG. 19, the resetting constant current circuit 153 of the first configuration example shown in FIG. 3 is omitted and the signal side is provided with a resetting NMOS transistor 241 and a switch 242 instead.

The drain of the resetting NMOS transistor 241 is connected to the drain of the PMOS load 152 and the column signal line 41 and the source of the resetting NMOS transistor 241 is connected to the low potential Vbrg (for example, GND) via the switch 242. A bias voltage Vbn for turning on the resetting NMOS transistor 241 is normally supplied to the gate of the resetting NMOS transistor 241. The switch 242 turns on and off the connection between the source of the resetting NMOS transistor 241 and the low potential Vbrg on the basis of the control signal SWR.

The operation of the eleventh configuration example of FIG. 19 will be described with reference to the flowchart of FIG. 4. That is, when the control signal SWR of Hi is supplied to the switch 242 to turn on the switch 242 at the same time when the reset transistor 103 of the unit pixel 10S and the reset transistor 113 of the dummy pixel 10D are turned on during a period from the time t2 to the time t4, a predetermined current flows from the drain of the PMOS load 152 to the low potential Vbrg via the resetting NMOS transistor 241. In other periods, since the control signal SWR of Lo is supplied to the switch 242 to turn off the switch 242, a current does not flow between the drain and the source of the resetting NMOS transistor 241.

The differential amplifier components 12 of the seventh to tenth configuration examples shown in FIGS. 15 to 18 adjusts the operation point of the differential amplifier to the upside (the high potential side) in relation to the original operation point of the differential amplifier by increasing the amount of the current supplied to the reference side amplification transistor 114 compared to the signal side amplification transistor 104 during the resetting period.

In contrast, the differential amplifier component 12 of the eleventh configuration example of FIG. 19 adjusts the operation point of the differential amplifier to the upside (the high potential side) in relation to the original operation point of the differential amplifier by drawing a part of the current flowing through the PMOS load 152 to the resetting NMOS transistor 241 during the resetting period so that the amount of the current supplied to the signal side amplification transistor 104 becomes smaller than that of the reference side amplification transistor 114.

14. Twelfth Configuration Example of Differential Amplifier Component

Figure 20:
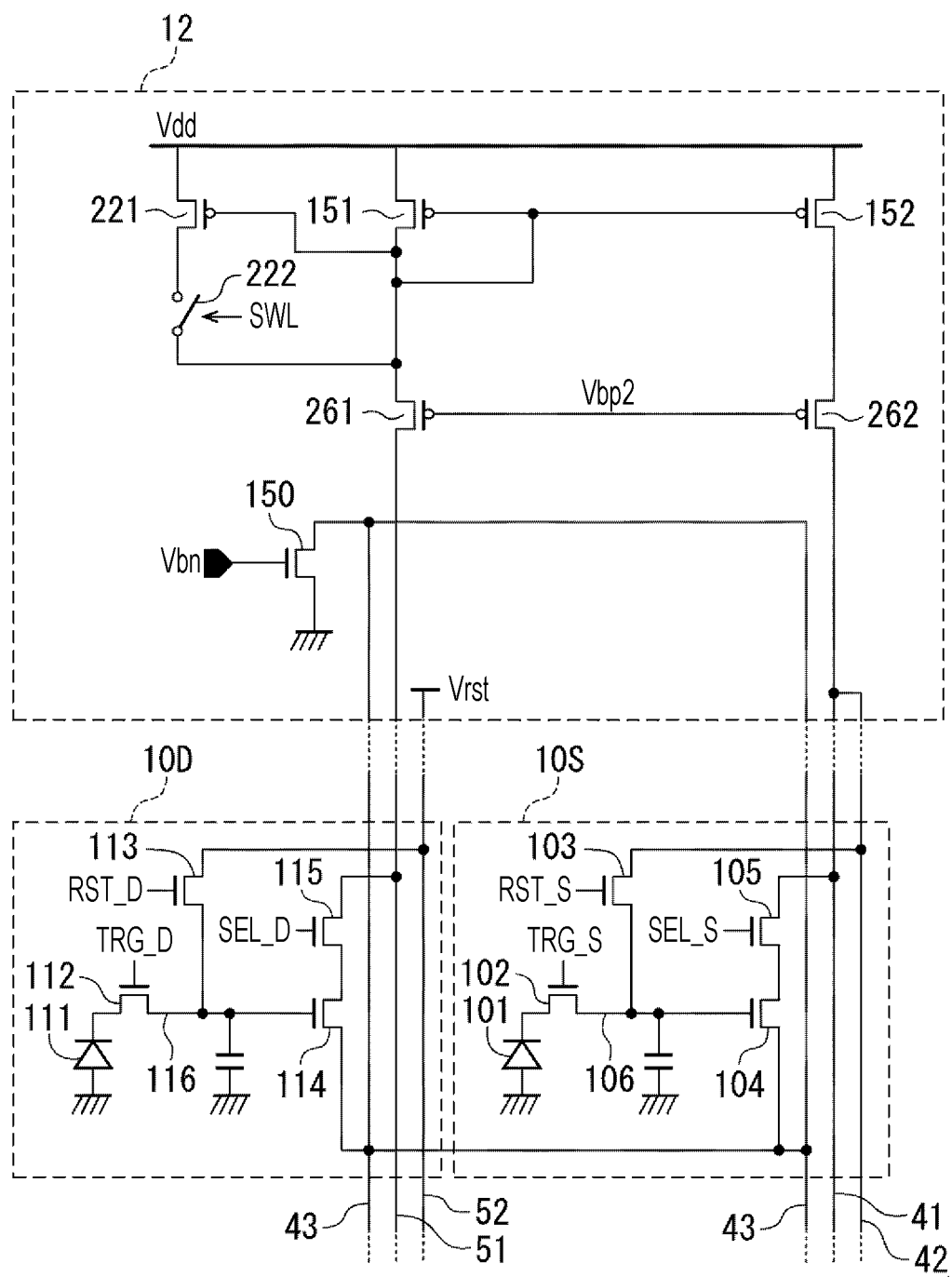
FIG. 20 is a diagram showing a twelfth configuration example of the differential amplifier component.

FIG. 20 is a diagram showing a twelfth configuration example of the differential amplifier component 12.

The differential amplifier component 12 of the twelfth configuration example of FIG. 20 has a configuration in which PMOS transistors 261 and 262 are added to the tenth configuration example shown in FIG. 18 by a cascode connection.

Specifically, the source of the PMOS transistor 261 is connected to the drain and the gate of the PMOS load 151, the gate of the resetting PMOS transistor 221, and the other end different from the side of the resetting PMOS transistor 221 in the switch 222. The drain of the PMOS transistor 261 is connected to the drain of the selection transistor 115 via the column signal line 51.

The source of the PMOS transistor 262 is connected to the drain of the PMOS load 152. The drain of the PMOS transistor 262 is connected to the drains of the selection transistor 105 and the reset transistor 103 via the column signal line 41 and the column reset line 42.

A bias voltage Vbp2 is applied to the gates of the PMOS transistors 261 and 262.

15. Thirteenth Configuration Example of Differential Amplifier Component

Figure 21:
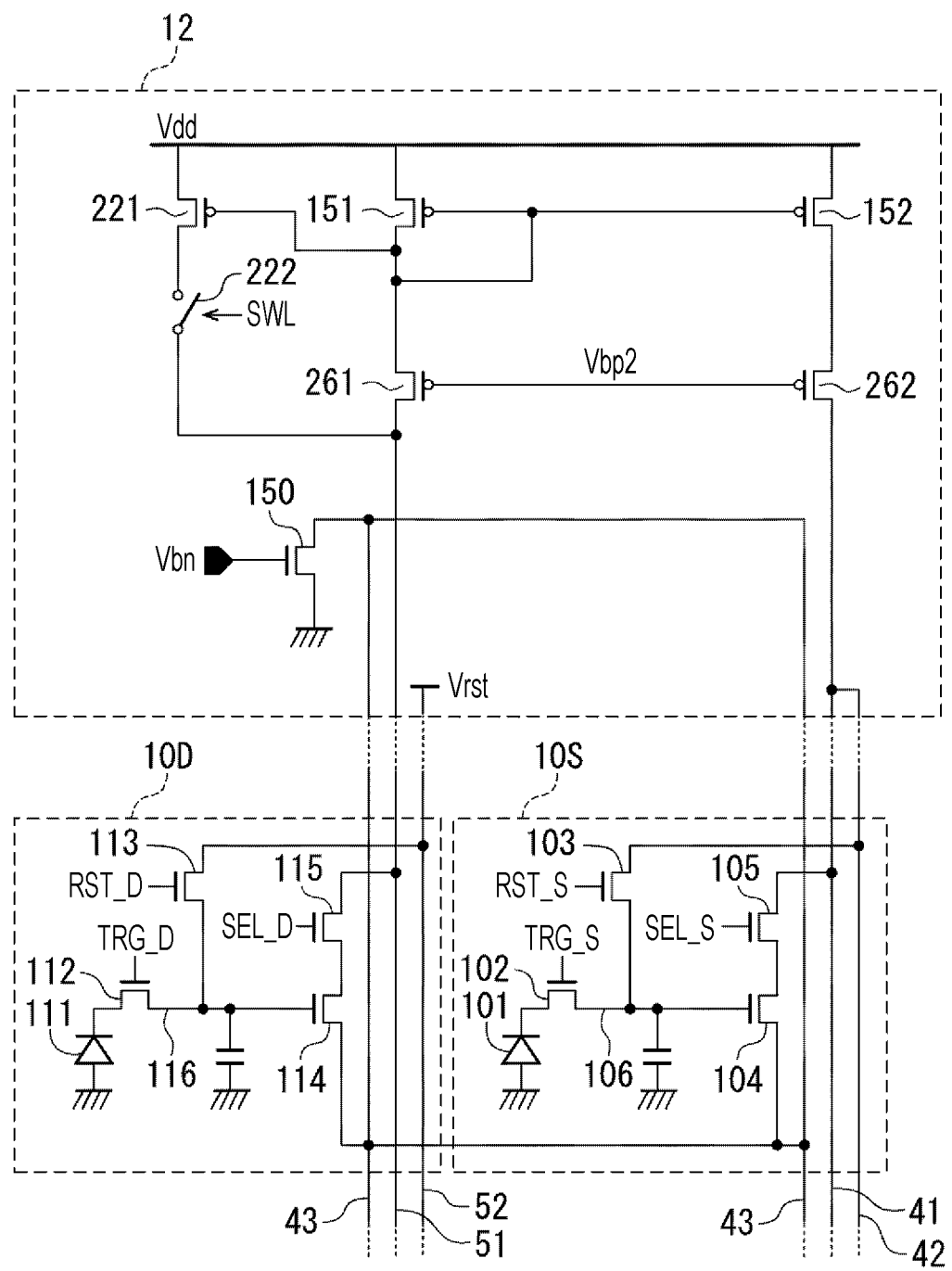
FIG. 21 is a diagram showing a thirteenth configuration example of the differential amplifier component.

FIG. 21 is a diagram showing a thirteenth configuration example of the differential amplifier component 12.

The differential amplifier component 12 of the thirteenth configuration example of FIG. 21 is different from that of the twelfth configuration example of FIG. 20 in that the connection destination of the other end different from the side of the resetting PMOS transistor 221 in the switch 222 is different.

In the twelfth configuration example of FIG. 20, the other end different from the side of the resetting PMOS transistor 221 in the switch 222 is connected to the source side of the PMOS transistor 261. However, in the thirteenth configuration example of FIG. 21, the other end thereof is connected to the drain side of the PMOS transistor 261. The other configurations are similar to those of the twelfth configuration example.

16. Fourteenth Configuration Example of Differential Amplifier Component

Figure 22:
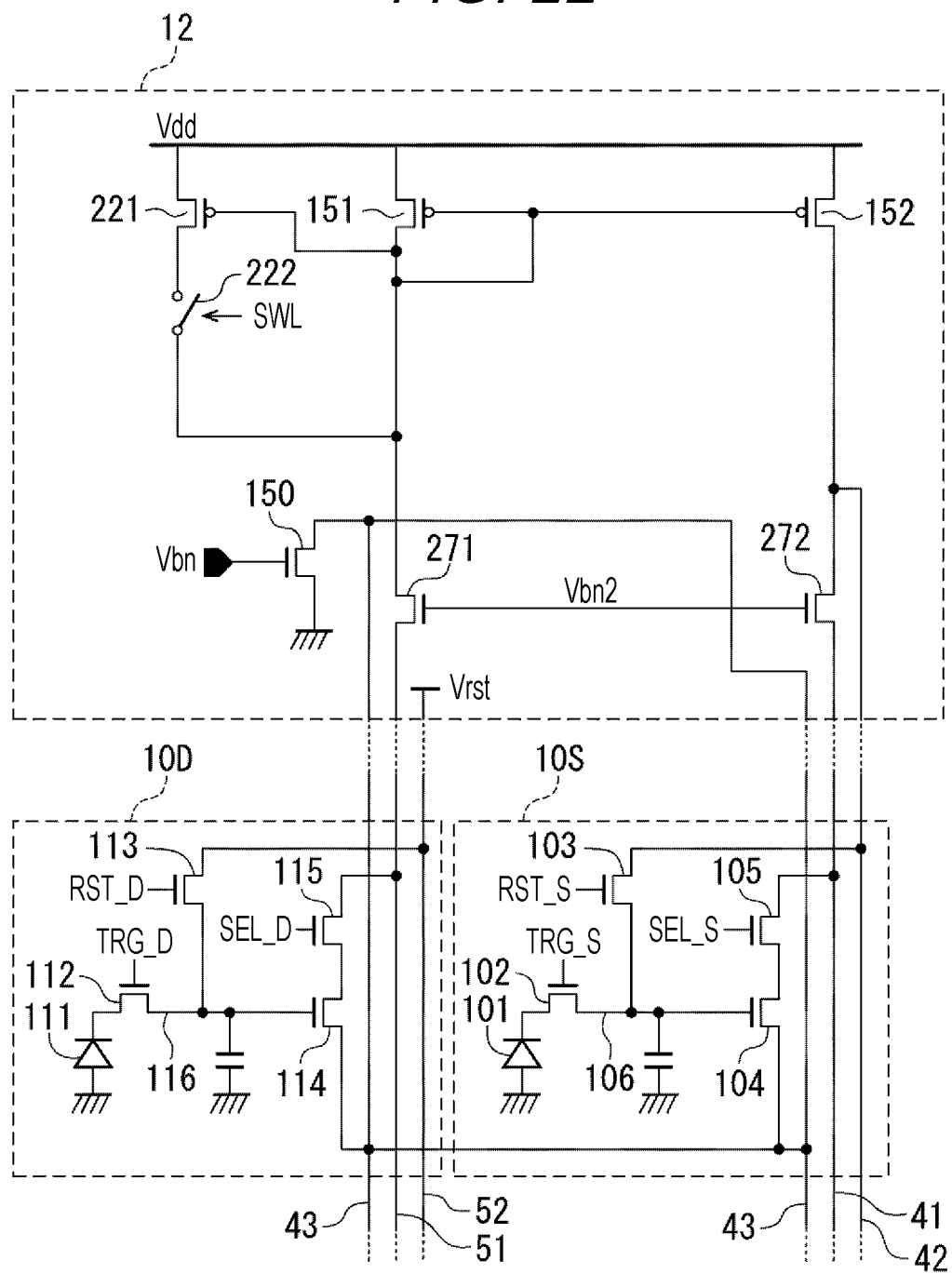
FIG. 22 is a diagram showing a fourteenth configuration example of the differential amplifier component.

FIG. 22 is a diagram showing a fourteenth configuration example of the differential amplifier component 12.

The differential amplifier component 12 of the fourteenth configuration example of FIG. 22 has a configuration in which the NMOS transistors 271 and 272 are added to the tenth configuration example shown in FIG. 18 by a cascode connection.

Specifically, the drain of the NMOS transistor 271 is connected to the drain and the gate of the PMOS load 151, the gate of the resetting PMOS transistor 221, and the other end different from the side of the resetting PMOS transistor 221 in the switch 222. The source of the NMOS transistor 271 is connected to the drain of the selection transistor 115 via the column signal line 51.

The drain of the NMOS transistor 272 is connected to the drain of the PMOS load 152. The drain of the NMOS transistor 272 is connected to the drains of the selection transistor 105 and the reset transistor 103 via the column signal line 41 and the column reset line 42.

A bias voltage Vbn2 is applied to the gates of the NMOS transistors 271 and 272.

17. Fifteenth Configuration Example of Differential Amplifier Component

Figure 23:
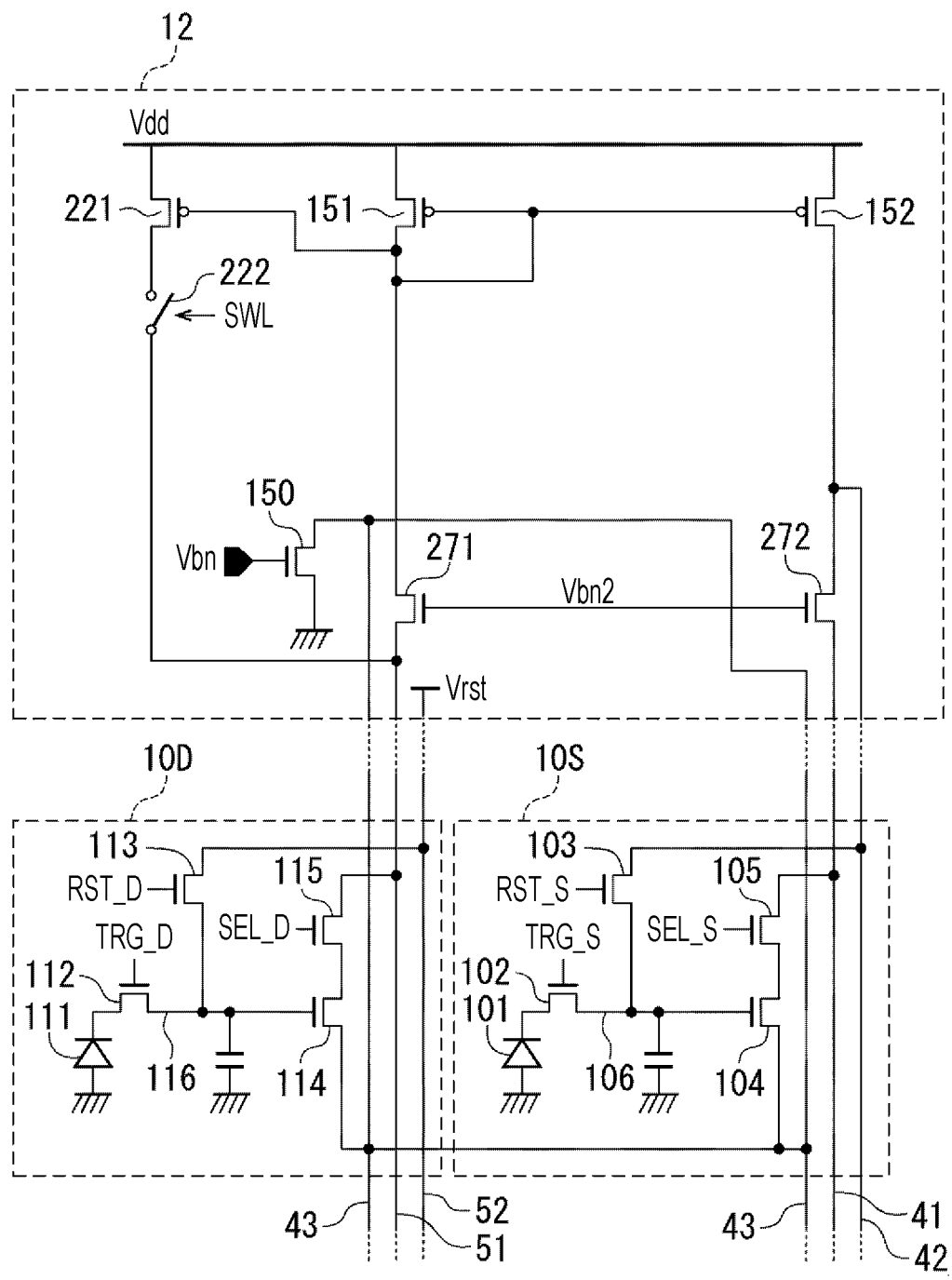
FIG. 23 is a diagram showing a fifteenth configuration example of the differential amplifier component.

FIG. 23 is a diagram showing a fifteenth configuration example of the differential amplifier component 12.

The differential amplifier component 12 of the fifteenth configuration example of FIG. 23 is different from that of the fourteenth configuration example of FIG. 22 in that the connection destination of the other end different from the side of the resetting PMOS transistor 221 in the switch 222 is different.

In the fourteenth configuration example of FIG. 22, the other end different from the side of the resetting PMOS transistor 221 in the switch 222 is connected to the drain side of the NMOS transistor 271. However, in the fifteenth configuration example of FIG. 23, the other end thereof is connected to the source side of the NMOS transistor 271. The other configurations are similar to those of the thirteenth configuration example.

Also in the differential amplifier components 12 of the twelfth to fifteenth configuration examples having a cascode structure shown in FIGS. 20 to 23, similarly to the tenth configuration example shown in FIG. 18, the potential VSL_S of the column signal line 41 can be adjusted to the optimal operation point (operation range) of the differential amplifier located at the upside (the high potential side) in relation to the original operation point of the differential amplifier. As a result, it is possible to improve linearity by improving the conversion efficiency of the amplification transistor 104.

The differential amplifier components 12 of the seventh configuration example of FIG. 15 to the fifteenth configuration example of FIG. 23 are configured to adjust the operation point (the operation range) of the differential amplifier to the upside (the high potential side) in relation to the original operation point of the differential amplifier by increasing the amount of the current supplied to the reference side amplification transistor 114 to be larger than the amount of the current supplied to the signal side amplification transistor 104 during the resetting period.

However, in the seventh configuration example of FIG. 15 to the fifteenth configuration example of FIG. 23 (excluding the eleventh configuration example of FIG. 19), the resetting circuit generating a current difference is provided at the signal side like, for example, the second configuration example of FIG. 5 and in the eleventh configuration example of FIG. 19, the resetting circuit generating a difference in current is provided at the reference side. With this configuration, if the amount of the current supplied to the signal side amplification transistor 104 becomes larger than the amount of the current supplied to the reference side amplification transistor 114 during the resetting period, the operation point (the operation range) of the differential amplifier can be adjusted to the downside (the low potential side) in relation to the original operation point of the differential amplifier.

Further, for example, similarly to the third configuration example of FIG. 7, the resetting circuits of the seventh configuration example of FIG. 15 to the fifteenth configuration example of FIG. 23 are provided at both the reference side and the signal side. With this configuration, the operation point (the operation range) of the differential amplifier can be, of course, adjusted to both the upside (the high potential side) and the downside (the low potential side) in relation to the original operation point of the differential amplifier.

18. Schematic Configuration of Solid-State Imaging Device of Second Embodiment FIG. 24 is a diagram showing a schematic configuration of a solid-state imaging device according to a second embodiment of the present technology.

Figure 24:
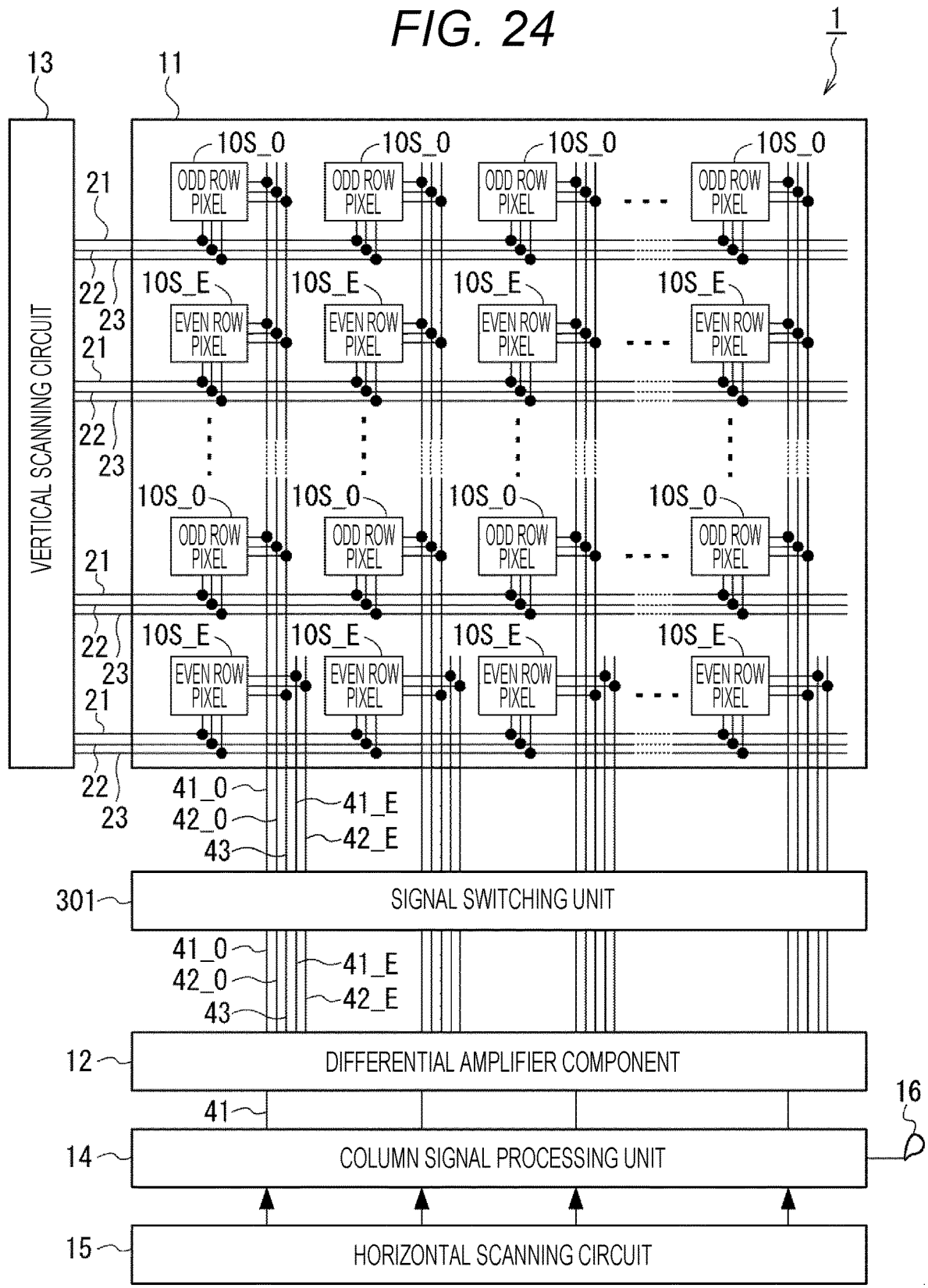
FIG. 24 is a diagram showing a schematic configuration of a solid-state imaging device according to a second embodiment of the present technology.

In FIG. 24, the same reference numerals will be given to the parts common to those of the first embodiment shown in FIG. 1 and a description of the part will be appropriately omitted.

In the above-described first embodiment, the differential pair of the differential amplifier includes the unit pixel 10S inside the effective pixel area and the dummy pixel 10D outside the effective pixel area of the pixel array unit 11.

In the second embodiment, the differential pair of the differential amplifier includes the unit pixel 10S disposed in the odd row (hereinafter, referred to as an odd row pixel 10S_O) and the unit pixel 10S disposed in the even row (hereinafter, referred to as an even row pixel 10S_E) in the unit pixels 10S inside the effective pixel area of the pixel array unit 11.

In the pixel array unit 11, the odd row pixel 10S_O and the even row pixel 10S_E are alternately arranged in the vertical direction. In FIG. 24, the column signal line 41 and the column reset line 42 connected to the odd row pixel 10S_O are indicated by a column signal line 41_O and a column reset line 42_O and the column signal line 41 and the column reset line 42 connected to the even row pixel 10S_E are indicated by a column signal line 41_E and a column reset line 42_E.

Additionally, the dummy pixel 10D disposed outside the effective pixel area is not shown in FIG. 24.

A signal switching unit 301 is newly added to the solid-state imaging device 1 of the second embodiment. The signal switching unit 301 switches the output destination of the pixel signal in a case where the signal side pixel of the differential pair of the differential amplifier component 12 is the odd row pixel 10S_O or the even row pixel 10S_E. In a case where the odd row pixel 10S_O is the signal side pixel of the differential pair, the even row pixel 10S_E becomes the reference side pixel of the differential pair. Meanwhile, in a case where the even row pixel 10S_E is the signal side pixel of the differential pair, the odd row pixel 10S_O becomes the reference side pixel of the differential pair. The odd row pixel 10S_O and the even row pixel 10S_E constituting the differential pair do not need to be the unit pixels 10S of the adjacent pixel rows. However, since the correlation of the device variations becomes higher as the distance between the pixels constituting the differential pair becomes shorter, the characteristic variation may be decreased if the differential pair includes the odd row pixel 10S_O and the even row pixel 10S_E of the adjacent pixel rows.

19. Configuration Example of Signal Switching Unit

Figure 25:
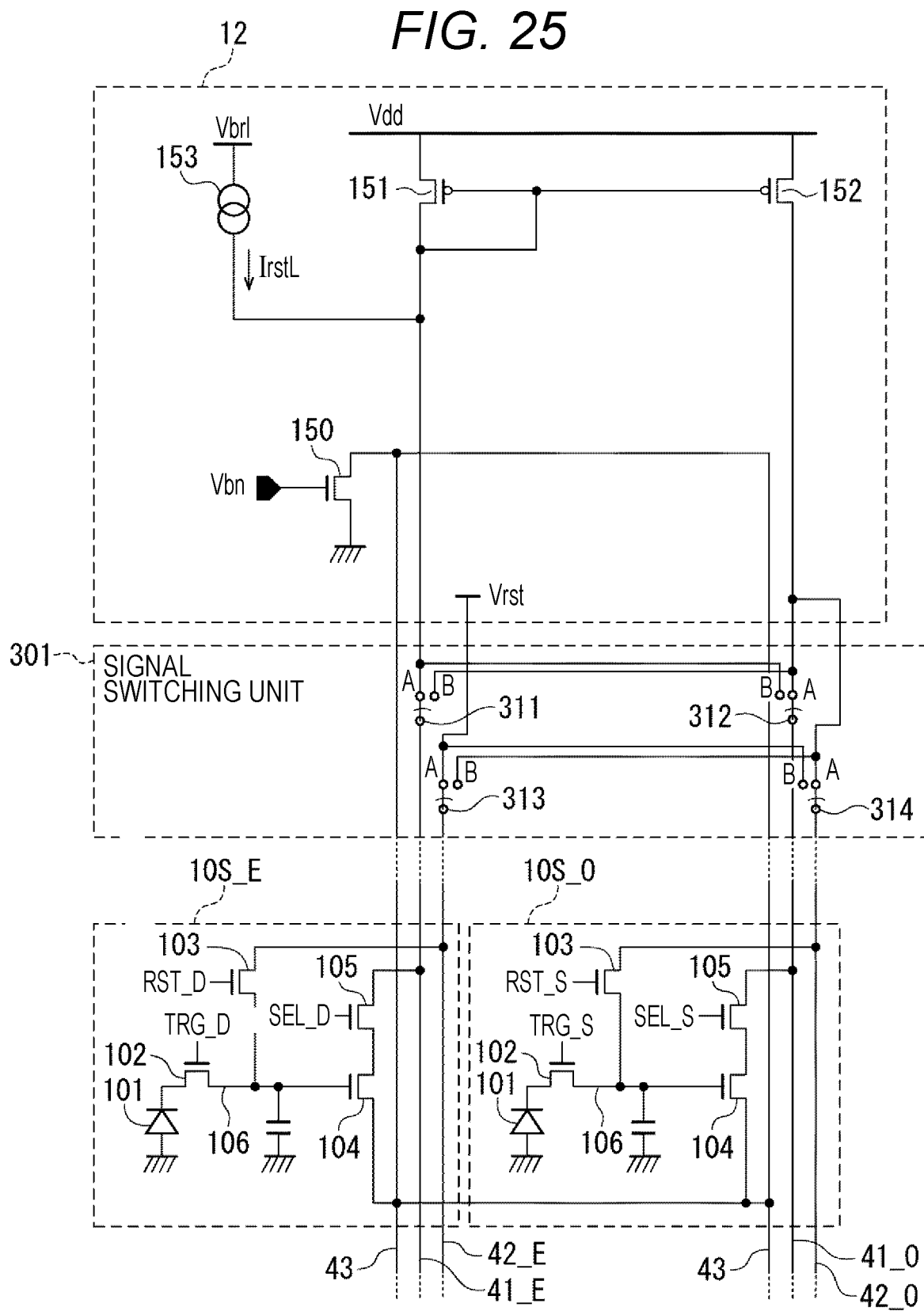
FIG. 25 is a diagram showing a detailed configuration of a signal switching unit.

FIG. 25 is a diagram showing a detailed configuration of the signal switching unit 301 along with the details of the differential amplifier component 12, the odd row pixel 10S_O, and the even row pixel 10S_E.

In FIG. 25, the differential amplifier component 12 of the first configuration example shown in FIG. 3 is employed as the differential amplifier component 12. Both the odd row pixel 10S_O and the even row pixel 10S_E have the same configuration as that of the unit pixel 10S shown in FIG. 3.

The signal switching unit 301 includes switches 311 to 314 which switch the terminals A and B. The switch 311 switches the column signal line 41_E of the even row pixel 10S_E to the signal side or the reference side of the differential amplifier component 12. The switch 312 switches the column signal line 41_O of the odd row pixel 10S_O to the signal side or the reference side of the differential amplifier component 12. The switch 313 switches the connection destination of the reset transistor 103 of the even row pixel 10S_E to the reset voltage Vrst or the drain of the PMOS load 152. The switch 314 switches the connection destination of the reset transistor 103 of the odd row pixel 10S_O to the reset voltage Vrst or the drain of the PMOS load 152.

An example of FIG. 25 shows a state in which the switches 311 to 314 all select the terminal A. In this case, the odd row pixel 10S_O becomes the signal side of the differential pair to perform the same operation as that of the unit pixel 10S of FIG. 3 and the even row pixel 10S_E becomes the reference side of the differential pair to perform the same operation as that of the dummy pixel 10D of FIG. 3.

The reset control signal RST_S, the transfer control signal TRG_S, and the selection control signal SEL_S of the even row pixel 10S_E at the reference side are controlled in the same manner as the reset control signal RST_D, the transfer control signal TRG_D, and the selection control signal SEL_D of FIG. 4 and the reset control signal RST_S, the transfer control signal TRG_S, and the selection control signal SEL_S of the odd row pixel 10S_O at the signal side are controlled in the same manner as the reset control signal RST_S, the transfer control signal TRG_S, and the selection control signal SEL_S of FIG. 4.

In contrast, in a case where the switches 311 to 314 all select the terminal B, the even row pixel 10S_E becomes the signal side of the differential pair to perform the same operation as that of the unit pixel 10S of FIG. 3 and the odd row pixel 10S_O becomes the reference side of the differential pair to perform the same operation as that of the dummy pixel 10D of FIG. 3.

The signal switching unit 301 switches the terminals A and B of the switches 311 to 314 by, for example, the unit of row.

Also in the solid-state imaging device 1 of the above-described second embodiment, the original operation point of the differential amplifier can be adjusted to the optimal operation range located at the upside (the high potential side) in relation to the original operation point of the differential amplifier. As a result, it is possible to improve linearity by improving the conversion efficiency of the amplification transistor 104.

Additionally, in the above-described second embodiment, a configuration in which the differential amplifier component 12 of the first configuration example shown in FIG. 3 is employed as the differential amplifier component 12 has been exemplified, but it is needless to mention that the second to fifteenth configuration examples or other configurations (not shown) can be employed.

20. Summary

The solid-state imaging device 1 according to an embodiment of the present technology includes the pixel array unit 11 in which the first and second unit pixels are arranged and the differential amplifier component 12 which constitutes the differential amplifier along with the amplification transistor and the selection transistor of the first and second unit pixels. In the solid-state imaging device 1 of the first embodiment, the first unit pixel is the unit pixel 10S and the second unit pixel is the dummy pixel 10D. In the solid-state imaging device 1 of the second embodiment, the first unit pixel is the odd row pixel 10S_O and the second unit pixel is the even row pixel 10S_E.

The differential amplifier component 12 includes the resetting circuit which generates a difference in current flowing to each of the signal side and the reference side of the differential pair during the resetting period of resetting the signal charge of the FD. The resetting circuit is the resetting constant current circuit 153 (153L, 153R) in the first to third configuration examples, the constant current source 171 and the switch 172 in the fourth to sixth configuration examples, the resetting PMOS transistor 191 in the seventh configuration example, the switch 201 and the resistor 202 in the eighth configuration example, the resetting PMOS transistor 221 and the switch 222 in the ninth and tenth configuration examples, and the resetting NMOS transistor 241 and the switch 242 in the eleventh configuration example. These resetting circuits are disposed between the node of the arbitrary voltage (Vbrl, Vbrr, Vdd, Vbrg, Vdd) and the source node of the NMOS transistor (271, 272) or the drain node of the PMOS transistor (151, 152) at the signal side or the reference side of the differential pair of the differential amplifier component 12.

Since the resetting circuit performs a control of generating a difference in current flowing to each of the signal side and the reference side of the differential pair during the resetting period and allows the current flowing to each of the signal side and the reference side of the differential pair to be the same during the reading period, the operation point of the differential amplifier can be adjusted to the optimal operation point.

Additionally, the control of the resetting circuit may be performed inversely. That is, even in a case where the resetting circuit performs a control in which the currents flowing to the signal side and the reference side of the differential pair are the same during the resetting period and a difference in current is generated in the signal side and the reference side of the differential pair during the reading period, the operation point of the differential amplifier can be adjusted to the optimal operation point. For example, the same current flows to the signal side and the reference side of the differential pair when the resetting circuit is turned on (during the resetting period) while the transistor sizes (for example, W sizes) of the signal side and the reference side of the differential pair are different from each other and a difference in current is generated in the current flowing to each of the signal side and the reference side of the differential pair when the resetting circuit is turned off.

Thus, since the solid-state imaging device 1 includes the current generation circuit which generates a difference in current flowing to each of the signal side and the reference side of the differential pair during the resetting period or the reading period as in the above-described resetting circuit, the operation point of the differential amplifier can be adjusted to the optimal operation point.

21. Application Example of Electronic Apparatus

The present technology is not limited to the application to the solid-state imaging device. That is, the present technology can be applied to all electronic apparatuses using a solid-state imaging device for an image capturing unit (a photoelectric conversion unit) like an imaging apparatus such as a digital still camera or a video camera, a mobile terminal device having an imaging function, or a copying machine using a solid-state imaging device in an image reading unit. The solid-state imaging device may be in a form formed as a single chip or in a modular form having an imaging function in which an imaging unit and a signal processing unit or an optical system are packaged together.

Figure 26:
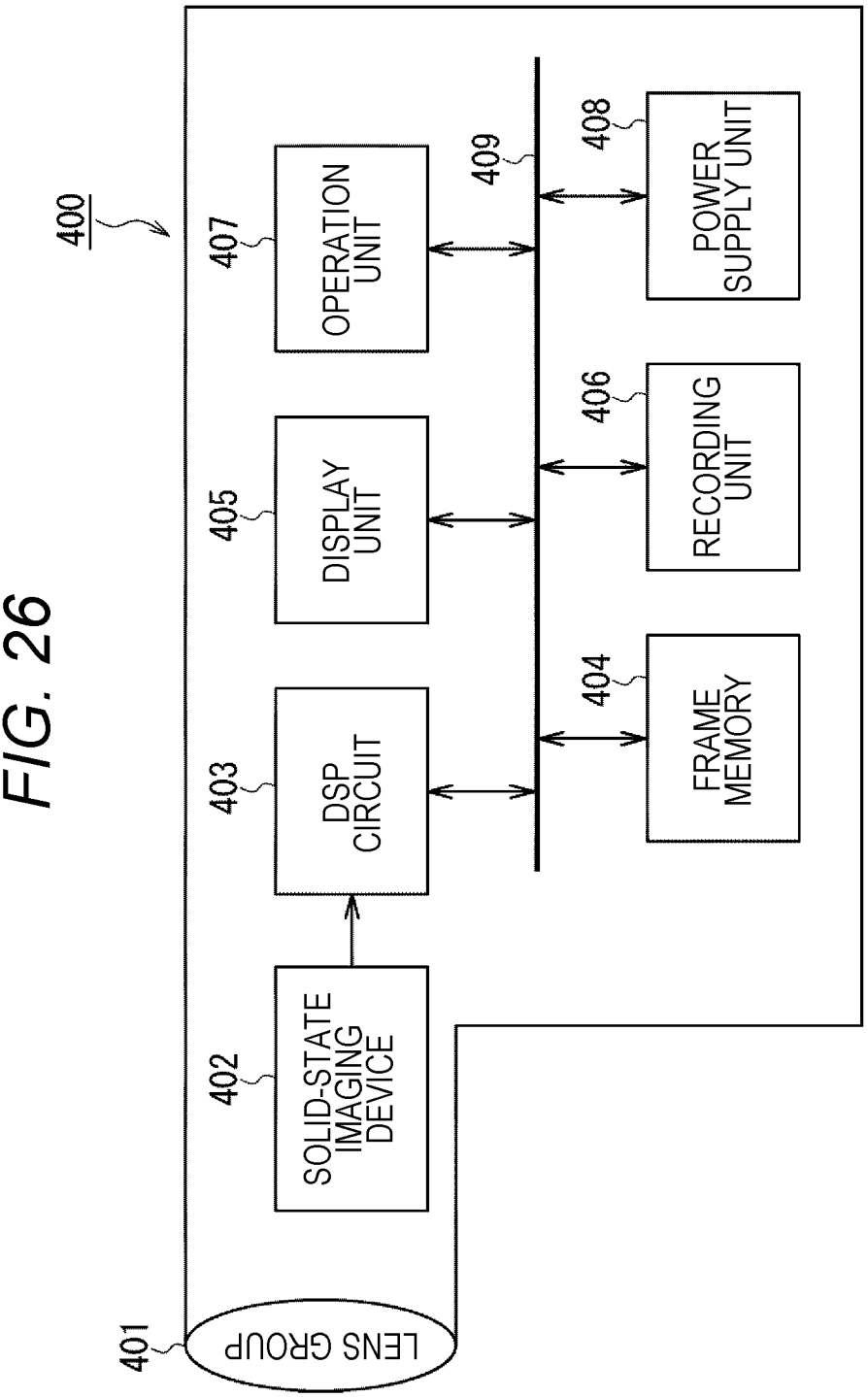
FIG. 26 is a block diagram showing a configuration example of an imaging apparatus which is an electronic apparatus according to an embodiment of the present technology.

FIG. 26 is a block diagram showing a configuration example of an imaging apparatus which is an electronic apparatus according to an embodiment of the present technology.

An imaging apparatus 400 of FIG. 26 includes an optical unit 401 which is a lens group or the like, a solid-state imaging device (an imaging device) 402 which adopts the configuration of the solid-state imaging device 1 of FIG. 1 or 24, and a digital signal processor (DSP) circuit 403 which is a camera signal process circuit. Further, the imaging apparatus 400 also includes a frame memory 404, a display unit 405, a recording unit 406, an operation unit 407, and a power supply unit 408. The DSP circuit 403, the frame memory 404, the display unit 405, the recording unit 406, the operation unit 407, and the power supply unit 408 are connected to one another via a bus line 409.

The optical unit 401 takes incident light (image light) from a subject and forms an image on an imaging surface of the solid-state imaging device 402. The solid-state imaging device 402 converts a light amount of the incident light formed as an image on the imaging surface by the optical unit 401 into an electric signal by the unit of pixel and outputs the electric signal as a pixel signal. As the solid-state imaging device 402, the solid-state imaging device 1 of FIG. 1 or 24, that is, the solid-state imaging device capable of adjusting the operation point (the operation range) of the differential amplifier from the original operation point of the differential amplifier to the optimal operation point can be used.

The display unit 405 includes, for example, a thin display such as a liquid crystal display (LCD) or an organic electro luminescence (EL) display and displays a moving image or a still image captured by the solid-state imaging device 402. The recording unit 406 records a moving image or a still image captured by the solid-state imaging device 402 in a recording medium such as a hard disk or a semiconductor memory.

The operation unit 407 generates operation instructions for various functions of the imaging apparatus 400 under the operation of the user. The power supply unit 408 supplies power to supply targets like the DSP circuit 403, the frame memory 404, the display unit 405, the recording unit 406, and the operation unit 407.

As described above, if the solid-state imaging device 1 according to the above-described embodiments is used as the solid-state imaging device 402, it is possible to improve linearity by improving the conversion efficiency of the amplification transistor 104. Thus, it is possible to improve the quality of the captured image even in the imaging apparatus 400 such as a video camera, a digital camera, and a mobile device camera for a cellular phone.

Application Example of Image Sensor

Figure 27:
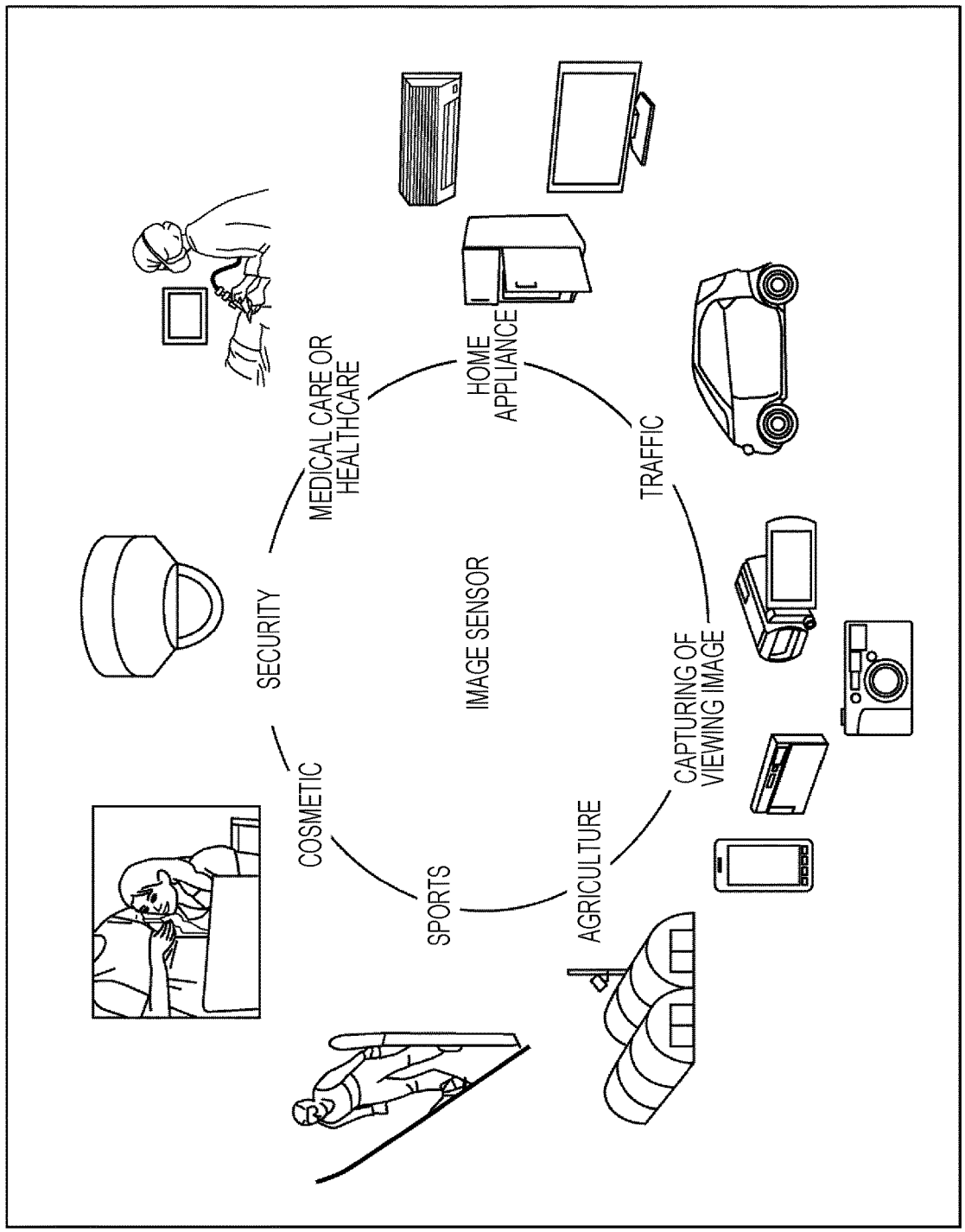
FIG. 27 is a diagram showing an application example of an image sensor.

FIG. 27 is a diagram showing an application example of an image sensor corresponding to the above-described solid-state imaging device 1.

The image sensor including the configuration of the above-described solid-state imaging device 1 can be used for, for example, various cases of sensing visible light, infrared light, ultraviolet light, and X rays as below.

- Device used for capturing viewing image, such as digital camera or portable device with camera function
- Device used for traffic, such as vehicle sensors for capturing images at front, back, periphery, and inside of car for safe driving such as automatic stop and recognition of driver state, monitoring camera for monitoring traveling vehicle or road, and ranging sensors for measuring vehicle-to-vehicle distance
- Device used for home appliances such as TV, refrigerator, and air conditioner in order to capture gesture of user and operate device according to gesture
- Device for medical care or healthcare, such as endoscope and device performing angiography by receiving infrared light
- Device for security, such as surveillance camera for preventing crime and camera for authenticating person
- Device for cosmetics, such as skin measuring device for capturing skin and microscope for capturing scalp
- Device for sports, such as wearable camera or action camera for sports application
- Device for agriculture, such as camera for monitoring condition of fields and crops Further, the present technology is not limited to the application to the solid-state imaging device that captures an image by detecting a distribution of an incident light amount of visible light and can be also applied to a solid-state imaging device that captures an image from a distribution of an incident light amount of infrared light, X-ray, or particle or all solid-state imaging devices (physical quantity distribution detection devices) such as finger print detection devices that capture an image by detecting other physical quantities such as a pressure or a static capacity as a broad meaning.

Further, the present technology is not limited to the solid-state imaging device and can be applied to all semiconductor devices including other semiconductor integrated circuits.

The embodiments of the present technology are not limited to the above-described embodiments and various modifications can be made without departing from the spirit of the present technology.

For example, as the pixel configuration of the pixel array unit 11, a pixel configuration may be employed in which a charge storage unit is provided between the transfer transistor and the FD to temporarily store a charge generated by the PD and a global shutter operation simultaneously exposing all pixels is possible. Further, an FD sharing pixel configuration that shares the FD by the adjacent pixels can be also employed.

For example, in the above-described circuit configurations, it is also possible to realize a circuit configuration in which the polarity of the transistor (NMOS transistor and PMOS transistor) is switched. In that case, Hi and Lo are opposite signals for the control signal input to the transistor.

In the above-described embodiments, it has been described such that the reference signal is a slope signal in which the level (voltage) monotonically increases with the elapse of time, but the reference signal may be a slope signal in which the level (voltage) monotonously decreases with the elapse of time.

For example, a configuration in which all or a part of the above-described embodiments are combined can be employed.

Additionally, the effects described in this specification are merely examples and are not intended to be limiting and there may be effects other than those described in this specification.

Additionally, the present technology can have the following configuration.

(1)

An imaging device comprising:
a plurality of pixels including a first pixel and a second pixel;
a differential amplifier including a first amplification transistor, a second amplification transistor, and a first load transistor, the first load transistor being configured to receive a power source voltage;
a first signal line coupled to the first amplification transistor and the first load transistor;
a second signal line coupled to the second amplification transistor;
a first reset transistor configured to receive the power source voltage, a gate of the first reset transistor being coupled to the first load transistor,
wherein the first pixel includes a first photoelectric conversion element and the first amplification transistor, and the second pixel includes a second photoelectric conversion element and the second amplification transistor.

(2)

The imaging device according to (1), further comprising:
a switch circuit coupled between the first reset transistor and the first signal line.

(3)

The imaging device according to (2), wherein the switch circuit connects one of a source and a drain of the first reset transistor to the first signal line during a reset operation of the first and second pixels such that the first signal line carries a larger current than the second signal line.

(4)

The imaging device according to (3), the switch circuit disconnects one of the source and the drain of the first reset transistor from the first signal line during a read operation of the first and second pixels such that the first signal line and the second signal line carry a same current.

(5)

The imaging device according to (1), further comprising:
a second load transistor configured to receive the power source voltage and coupled to the second signal line.

(6)

The imaging device according to (5), wherein the first pixel includes a second reset transistor, and the second pixel includes a third reset transistor.

(7)

The imaging device according to (6), further comprising:
a third signal line and a fourth signal line coupled to a reset voltage source; and
a signal switching unit to select one of the first pixel and the second pixel as a reference pixel and select the other one of the first pixel and the second pixel as an effective pixel through the first, second, third, and fourth signal lines.

(8)

The imaging device according to (7), wherein the signal switching unit includes:
a first switch between the first load transistor and the first amplification transistor;
a second switch between the second load transistor and the second amplification transistor;
a third switch between the second reset transistor and the reset voltage source; and
a fourth switch between the third reset transistor and the reset voltage source.

(9)

The imaging device according to (8), wherein each of the first, second, third and fourth switches are switchable between a first position and a second position.

(10)

The imaging device according to (9), wherein the signal switching unit causes the first, second, third, and fourth switches to be in the first position to select the first pixel as the reference pixel and the second pixel as the effective pixel, and wherein the signal switching unit causes the first, second third, and fourth switches to be in the second position to select the first pixel as the effective pixel and the second pixel as the reference pixel.

(11)

The imaging device according to (6), the first pixel is in an even numbered row of the plurality of pixels and the second pixel is in an odd numbered row of the plurality of pixels.

(12)

An imaging device comprising:
a first pixel including a first photoelectric conversion element, a first transfer transistor, and a first amplification transistor;
a second pixel including a second photoelectric conversion element, a second transfer transistor, and a second amplification transistor;
a first signal line coupled to the first amplification transistor;
a second signal line coupled to the second amplification transistor;
a first load transistor coupled to the first signal line, the first load transistor being configured to receive a power source voltage; and
a first reset transistor configured to receive the power source voltage, a gate of the first reset transistor being coupled to the first load transistor;
wherein one of a source and a drain of the first amplification transistor is coupled to one of a source and a drain of the second amplification transistor, and the other of the source and the drain of the first amplification transistor is coupled to the other of the source and the drain of the second amplification transistor.

(13)

The imaging device according to (12), further comprising:
a switch circuit coupled between the first reset transistor and the first signal line.

(14)

The imaging device according to (13), wherein the switch circuit connects one of a source and a drain of the first reset transistor to the first signal line during a reset operation of the first and second pixels such that the first signal line carries a larger current than the second signal line.

(15)

The imaging device according to (14), wherein the switch circuit disconnects one of the source and the drain of the first reset transistor from the first signal line during a read operation of the first and second pixels such that the first signal line and the second signal line carry a same current.

(16)

The imaging device according to (12), further comprising:
a second load transistor configured to receive the power source voltage and coupled to the second signal line, wherein the first pixel includes a second reset transistor, and the second pixel includes a third reset transistor;
a third signal line and a fourth signal line coupled to a reset voltage source; and
a signal switching unit to select one of the first pixel and the second pixel as a reference pixel and select the other one of the first pixel and the second pixel as an effective pixel through the first, second, third, and fourth signal lines.

(17)

An imaging device, comprising:
a differential amplifier including:
  a first load transistor coupled to a power source;
  a second load transistor coupled to the power source;
  a first amplification transistor of a first pixel;
  a second amplification transistor of a second pixel;
  a first signal line coupled to the first load transistor and the first amplification transistor; and
  a second signal line coupled to the second load transistor and the second amplification transistor, wherein outputs of the first and second amplification transistors are connected to one another; and
a reset element coupled to the differential amplifier and to reset the first pixel with a first current on the first signal line and reset the second pixel on the second signal line with a second current during a reset operation.

(18)

The imaging device according to (17), wherein the reset element comprises a first reset transistor and a switch circuit coupled between the first reset transistor and the first signal line,
wherein the switch circuit connects one of a source and a drain of the first reset transistor to the first signal line during the reset operation such that the first current is larger than the second current, and
wherein the switch circuit disconnects one of the source and the drain of the first reset transistor from the first signal line during a read operation of the first and second pixels such that first current and the second current are the same.

(19)

The imaging device according to (18), further comprising:
a third signal line and a fourth signal line coupled to a reset voltage source; and
a signal switching unit to select one of the first pixel and the second pixel as a reference pixel and select the other one of the first pixel and the second pixel as an effective pixel through the first, second, third, and fourth signal lines.

(20)

The imaging device according to (19),
wherein the first pixel includes a second reset transistor, and the second pixel includes a third reset transistor,
wherein the signal switching unit includes:
  a first switch between the first load transistor and the first amplification transistor;
  a second switch between the second load transistor and the second amplification transistor;
  a third switch between the second reset transistor and the reset voltage source; and
  a fourth switch between the third reset transistor and the reset voltage source,
wherein each of the first, second, third and fourth switches are switchable between a first position and a second position, and
wherein the signal switching unit causes the first, second, third, and fourth switches to be in the first position to select the first pixel as the reference pixel and the second pixel as the effective pixel, and wherein the signal switching unit causes the first, second third, and fourth switches to be in the second position to select the first pixel as the effective pixel and the second pixel as the reference pixel.

(21)

A solid-state imaging device including:
a pixel array unit provided with first and second unit pixels each including a photoelectric conversion element configured to photoelectrically convert light incident to a pixel, a transfer transistor configured to transfer a signal charge photoelectrically converted by the photoelectric conversion element to an FD, a reset transistor configured to reset the signal charge of the FD, an amplification transistor configured to convert the signal charge stored in the FD into a voltage signal and output the voltage signal, and a selection transistor configured to select the pixel; and
a differential amplifier component constituting a differential amplifier together with the amplification transistor and the selection transistor of the first and second unit pixels,
in which the differential amplifier component includes a current generation circuit that generates a difference in current flowing to each of a signal side and a reference side of a differential pair.

(22)

The solid-state imaging device according to (21), in which the current generation circuit generates a difference in current flowing to each of the signal side and the reference side of the differential pair during a resetting period of resetting the signal charge of the FD.

(23)

The solid-state imaging device according to (21) or (22), in which the current generation circuit outputs a predetermined current to the signal side or the reference side of the differential pair.

(24)

The solid-state imaging device according to any of (21) to (23), in which the current generation circuit draws a predetermined current from the signal side or the reference side of the differential pair.

(25)

The solid-state imaging device according to any of (21) to (24), in which a different current flows to the current generation circuit between the resetting period and a reading period of reading a signal converted into a voltage by the FD.

(26)

The solid-state imaging device according to any of (21) to (25), in which the current generation circuit includes a switch and an on/off state of a switch changes between the resetting period and a reading period of reading a signal converted into a voltage by the FD.

(27)

The solid-state imaging device according to (26), in which the current generation circuit includes a resistor.

(28)
The solid-state imaging device according to (26), in which the current generation circuit includes a transistor having a gate to which a constant bias voltage is applied.

(29)
The solid-state imaging device according to (26), in which the current generation circuit includes a transistor and a gate of the transistor is connected to a drain of a PMOS transistor at a signal side or a reference side of the differential pair.

(30)
The solid-state imaging device according to any of (21) to (25), in which the current generation circuit includes a transistor and a voltage applied to a gate thereof changes between the resetting period and a reading period of reading a signal converted into a voltage by the FD.

(31)
The solid-state imaging device according to any of (21) to (30), in which the differential amplifier has a cascode structure.

(32)
The solid-state imaging device according to any of (21) to (31), in which the first unit pixel is a pixel disposed inside an effective pixel area and the second unit pixel is a pixel disposed outside the effective pixel area.

(33)
The solid-state imaging device according to any of (21) to (31), in which the first unit pixel is a pixel disposed in an odd row inside an effective pixel area and the second unit pixel is a pixel disposed in an even row inside the effective pixel area.

(34)
The solid-state imaging device according to (33), further including:
a signal switching unit configured to switch pixel signal output destinations of the first unit pixel and the second unit pixel to the signal side or the reference side of the differential pair.

(35)
The solid-state imaging device according to any of (21) to (34), in which the differential amplifier component includes the current generation circuit at both the signal side and the reference side of the differential pair.

(36)
The solid-state imaging device according to any of (21) to (35), in which the current generation circuit is disposed between a node of an arbitrary voltage and a source node of an NMOS transistor or a drain node of a PMOS transistor at the signal side or the reference side of the differential pair of the differential amplifier component.

(37)
A method of controlling a solid-state imaging device including: a pixel array unit provided with first and second unit pixels each including a photoelectric conversion element configured to photoelectrically convert light incident to a pixel, a transfer transistor configured to transfer a signal charge photoelectrically converted by the photoelectric conversion element to an FD, a reset transistor configured to reset the signal charge of the FD, an amplification transistor configured to convert the signal charge stored in the FD into a voltage signal and output the voltage signal, and a selection transistor configured to select the pixel; and a differential amplifier component constituting a differential amplifier together with the amplification transistor and the selection transistor of the first and second unit pixels,
in which a current generation circuit of the differential amplifier component generates a difference in current flowing to each of a signal side and a reference side of a differential pair.

(38)
An electronic apparatus including
a solid-state imaging device including:
a pixel array unit provided with first and second unit pixels each including a photoelectric conversion element configured to photoelectrically convert light incident to a pixel, a transfer transistor configured to transfer a signal charge photoelectrically converted by the photoelectric conversion element to an FD, a reset transistor configured to reset the signal charge of the FD, an amplification transistor configured to convert the signal charge stored in the FD into a voltage signal and output the voltage signal, and a selection transistor configured to select the pixel; and
a differential amplifier component constituting a differential amplifier together with the amplification transistor and the selection transistor of the first and second unit pixels,
in which the differential amplifier component includes a current generation circuit that generates a difference in current flowing to each of a signal side and a reference side of a differential pair.

REFERENCE SIGNS LIST

1 Solid-state imaging device
10D Dummy pixel
10S Unit pixel
10S_E Even row pixel
10S_O Odd row pixel
11 Pixel array unit
12 Differential amplifier component
101 PD
102 Transfer transistor
103 Reset transistor
104 Amplification transistor
105 Selection transistor
106 FD
111 PD
112 Transfer transistor
113 Reset transistor
114 Amplification transistor
115 Selection transistor
116 FD
151, 152 PMOS load
153 (153L, 153R) Resetting constant current circuit
171 (171L, 171R) Constant current source
172 (172L, 172R) Switch
191 Resetting PMOS transistor
201 Switch
202 Resistor
221 Resetting PMOS transistor
222 Switch
241 Resetting NMOS transistor
242 Switch
261, 262 PMOS transistor
271, 272 NMOS transistor
301 Signal switching unit
311 to 314 Switch
400 Imaging apparatus 402 Solid-state imaging device

What is claimed is:

1. A light detecting device comprising:
a current mirror circuit;
a plurality of pixels arranged in columns and rows, the plurality of pixels including:
a first pixel including a first photoelectric conversion region, a first reset transistor, a first amplification transistor, and a first selection transistor; and
a second pixel including a second photoelectric conversion region, a second reset transistor, a second amplification transistor, and a second selection transistor;
switching circuitry coupled between the first and second pixels and the current mirror circuit, wherein the switching circuitry controls one of the first pixel or the second pixel to be one of a signal side pixel or a reference side pixel and controls the other of the first pixel or the second pixel to be the other of the signal side pixel or the reference side pixel.

2. The light detecting device according to claim 1, wherein the switching circuitry includes a first switch, a second switch, a third switch, and a fourth switch, wherein switching states of the first, second, third, and fourth switches control whether the first pixel and the second pixel is the signal side pixel or the reference side pixel.

3. The light detecting device according to claim 1, further comprising:
current source circuitry coupled to the switching circuitry; and
a transistor coupled to the first amplification transistor and the second amplification transistor.

4. The light detecting device according to claim 3, wherein the transistor is a tail current source.

5. The light detecting device according to claim 3, wherein the current source circuitry receives a power source voltage.

6. The light detecting device according to claim 1, wherein the current mirror circuit receives a power source voltage.

7. The light detecting device according to claim 1, wherein the first reset transistor and the second reset transistor are coupled to the switching circuitry.

8. The light detecting device according to claim 1, wherein a pixel signal is amplified by a differential amplifier that includes the first amplification transistor and the second amplification transistor.

9. The light detecting device according to claim 8, further comprising:
a comparator to receive the pixel signal.

10. The light detecting device according to claim 1, wherein the first pixel is an even row pixel and the second pixel is an odd row pixel.

11. An electronic apparatus, comprising:
signal processor; and
a light detecting device comprising:
a current mirror circuit;
a plurality of pixels arranged in columns and rows, the plurality of pixels including:
a first pixel including a first photoelectric conversion region, a first reset transistor, a first amplification transistor, and a first selection transistor; and
a second pixel including a second photoelectric conversion region, a second reset transistor, a second amplification transistor, and a second selection transistor;
switching circuitry coupled between the first and second pixels and the current mirror circuit, wherein the switching circuitry controls one of the first pixel or the second pixel to be one of a signal side pixel or a reference side pixel and controls the other of the first pixel or the second pixel to be the other of the signal side pixel or the reference side pixel.

12. The electronic apparatus according to claim 11, wherein the switching circuitry includes a first switch, a second switch, a third switch, and a fourth switch, wherein switching states of the first, second, third, and fourth switches control whether the first pixel and the second pixel is the signal side pixel or the reference side pixel.

13. The electronic apparatus according to claim 11, further comprising:
current source circuitry coupled to the switching circuitry; and
a transistor coupled to the first amplification transistor and the second amplification transistor.

14. The electronic apparatus according to claim 13, wherein the transistor is a tail current source.

15. The electronic apparatus according to claim 13, wherein the current source circuitry receives a power source voltage.

16. The electronic apparatus according to claim 11, wherein the current mirror circuit receives a power source voltage.

17. The electronic apparatus according to claim 11, wherein the first reset transistor and the second reset transistor are coupled to the switching circuitry.

18. The electronic apparatus according to claim 11, wherein a pixel signal is amplified by a differential amplifier that includes the first amplification transistor and the second amplification transistor.

19. The electronic apparatus according to claim 18, further comprising:
a comparator to receive the pixel signal.

20. The electronic apparatus according to claim 11, wherein the first pixel is an even row pixel and the second pixel is an odd row pixel.

* * * * *